United States Patent
Suzuki et al.

(10) Patent No.: US 7,918,090 B2
(45) Date of Patent: Apr. 5, 2011

(54) METHOD AND APPARATUS FOR CONTROLLING AN INTERNAL COMBUSTION ENGINE

(75) Inventors: Kunihiko Suzuki, Hitachinaka (JP); Mamoru Nemoto, Hitachiota (JP)

(73) Assignee: Hitachi, Ltd., Tokyo (JP)

(*) Notice: Subject to any disclaimer, the term of this patent is extended or adjusted under 35 U.S.C. 154(b) by 344 days.

(21) Appl. No.: 12/142,411

(22) Filed: Jun. 19, 2008

(65) Prior Publication Data
US 2009/0007564 A1    Jan. 8, 2009

(30) Foreign Application Priority Data
Jun. 26, 2007 (JP) ................. 2007-167068

(51) Int. Cl.
*F02D 23/00* (2006.01)
*F02D 13/02* (2006.01)
*F02B 33/44* (2006.01)
*F02B 29/08* (2006.01)
*F02B 29/02* (2006.01)

(52) U.S. Cl. ............. 60/602; 60/605.1; 60/611
(58) Field of Classification Search .......... 60/605.1, 60/602, 611, 612; 123/562; F02B 29/08, F02B 29/02; F02D 13/02
See application file for complete search history.

(56) References Cited

U.S. PATENT DOCUMENTS

| | | | | |
|---|---|---|---|---|
| 4,683,857 A | * | 8/1987 | Yasuoka | 123/676 |
| 6,401,457 B1 | * | 6/2002 | Wang et al. | 60/605.1 |
| 6,820,600 B1 | * | 11/2004 | Sisken et al. | 701/106 |
| 7,398,149 B2 | * | 7/2008 | Ueno et al. | 60/602 |
| 7,587,898 B2 | * | 9/2009 | Turner | 60/612 |
| 2007/0151241 A1 | * | 7/2007 | Arnold | 60/605.1 |

FOREIGN PATENT DOCUMENTS

| | | | | |
|---|---|---|---|---|
| JP | 58119922 A | * | 7/1983 | |
| JP | 62-026322 (A) | | 2/1987 | |
| JP | 30-31533 (A) | | 2/1991 | |
| JP | 07091265 A | * | 4/1995 | |
| JP | 08218879 A | * | 8/1996 | |
| JP | 08326548 A | * | 12/1996 | |
| JP | 10-220256 A | | 8/1998 | |
| JP | 10318005 A | * | 12/1998 | |
| JP | 11223137 A | * | 8/1999 | |

(Continued)

OTHER PUBLICATIONS

A Machine Translation Matsuyoshi et al. (Pub. No. JP 07-091265 A), Published on Apr. 4, 1995.*

(Continued)

*Primary Examiner* — Thai Ba Trieu
(74) *Attorney, Agent, or Firm* — Crowell & Moring LLP

(57) ABSTRACT

In a control device for an internal combustion engine having a turbocharger with a variable turbo flow rate, and an intake valve provided with a variable valve mechanism, mirror cycle operation is performed. The control device includes a device which calculates an intake air quantity per unit time and an intake air quantity per cycle on the basis of torque required to the internal combustion engine. The turbocharger is controlled so that, with the calculated intake air quantity per unit time, supercharging pressure is further increased in a range in which the ratio of exhaust pressure to supercharging pressure is equal to or less than a predetermined value. A further device, which controls the variable valve mechanism on the basis of the supercharging pressure and the calculated intake air quantity per cycle.

19 Claims, 20 Drawing Sheets

FOREIGN PATENT DOCUMENTS

| | | | | |
|---|---|---|---|---|
| JP | 11280502 | A | * | 10/1999 |
| JP | 2000204951 | A | * | 7/2000 |
| JP | 2000204952 | A | * | 7/2000 |
| JP | 2001193468 | A | * | 7/2001 |
| JP | 2004-183511 | | | 7/2004 |
| JP | 2010014110 | A | * | 1/2010 |

OTHER PUBLICATIONS

Japanese Office Action for JP 2007-167068 and translation thereof dated Sep. 1, 2009.

* cited by examiner

FIG.4A
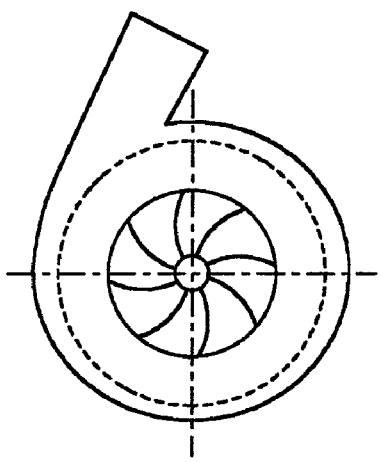
FIG.4B
MADE SMALL IN FLOW RATE
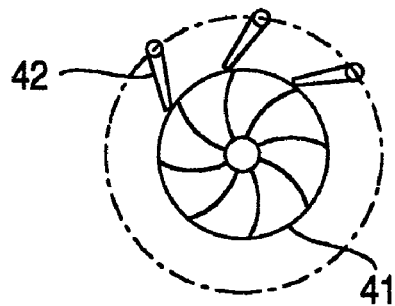
MADE LARGE IN FLOW RATE
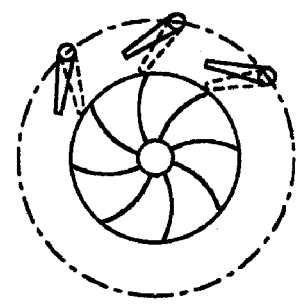

FULL OPENING TORQUE PERFORMANCE CURVE

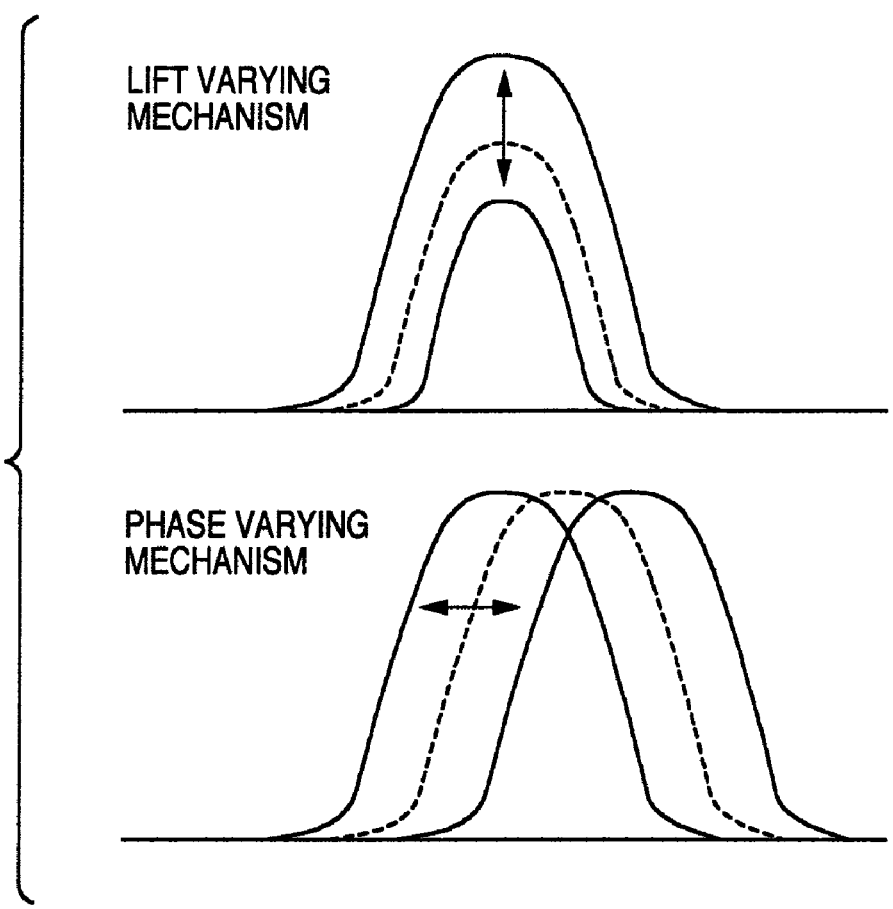
FIG.6A
FIG.6B
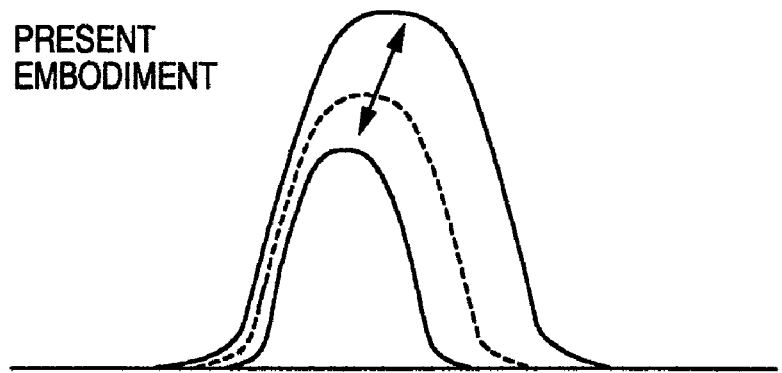

FIG. 13

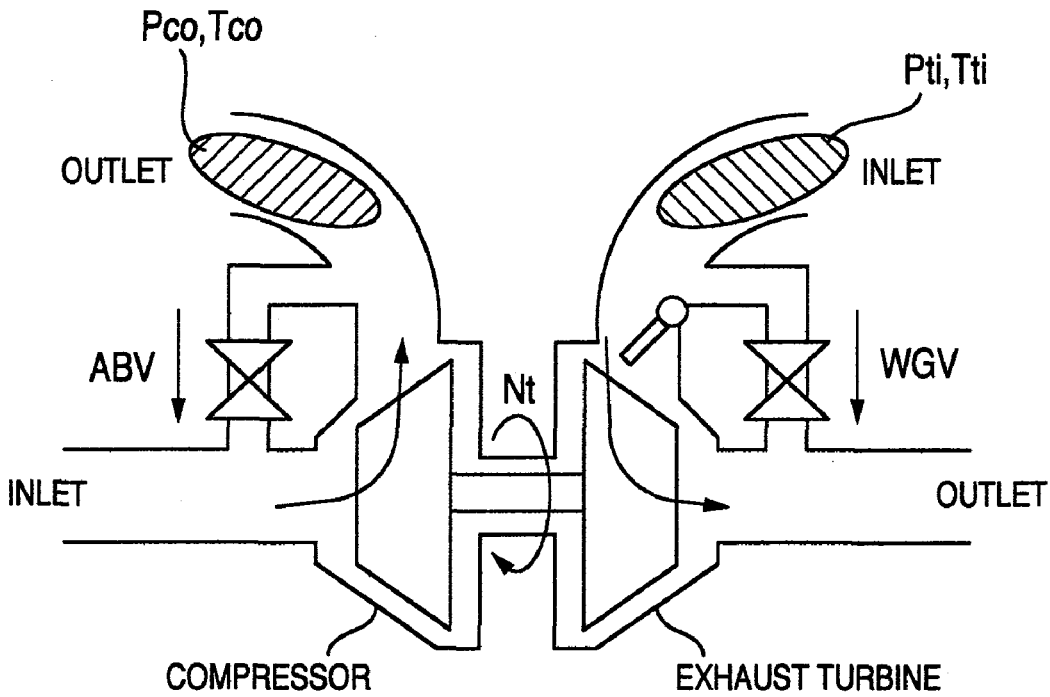

| TURBINE ROTATING SPEED Nt DEDUCTION MEANS |
|---|
| $dNt^2/dt = C(1/Jt) \times (Lt - Lc - Lf)$ |

| SUPERCHARGING PRESSURE Pco DEDUCTION MEANS |
|---|
| $\begin{cases} dMco/dt = dMcoi/dt - dMcoo/dt \\ \qquad\qquad\qquad - dMcoa/dt \\ dTco/dt = (1/(Mco \times Cp)) \\ \qquad \times (dHcoi/dt - dHcoo/dt \\ \qquad\qquad - dHcoa/dt - dQco/dt) \end{cases}$ |
| $Pco = (Mco \times R \times Tco)/Vco$ |

| EXHAUST PRESSURE Pti DEDUCTION MEANS |
|---|
| $\begin{cases} dMti/dt = dMtii/dt - dMtio/dt \\ \qquad\qquad\qquad - dMtiw/dt \\ dTti/dt = (1/(Mti \times Cp)) \\ \qquad \times (dHtii/dt - dHtio/dt \\ \qquad\qquad - dHtiw/dt - dQti/dt) \end{cases}$ |
| $Pti = (Mti \times R \times Tti)/Vti$ |

METHOD AND APPARATUS FOR CONTROLLING AN INTERNAL COMBUSTION ENGINE

BACKGROUND OF THE INVENTION

The present invention relates to an internal combustion engine comprising a turbocharger, which is variable in flow rate, and a variable intake valve.

Turbochargers, of which an exhaust turbine recovers, as rotational energy, thermal energy of exhaust gases discharged from an internal combustion engine, and in which a compressor provided coaxially with the exhaust turbine is used to compress an intake air of the internal combustion engine, are frequently used in conventional internal combustion engines. Since a turbocharger is mounted to enable a high output as compared with internal combustion engines, in which no turbocharger is mounted, and a cylinder volume required to realize the same output performance can be set to be small, it is possible to achieve a decrease in frictional loss and pumping loss, thus enabling reduction in fuel consumption.

Under conditions of quick acceleration from low speed, however, sufficient supercharging cannot be performed by virtue of a turbine rotating speed not rising, so that deterioration in operability, which is called turbo-lag, becomes frequently problematic. For the problem of turbo-lag, a turbocharger, in which flow rate-supercharging pressure characteristic is made small in flow rate, is used to cause exhaust pressure to rise quickly even in small flow rate at the time of low speed whereby it is possible to avoid the turbo-lag. However, internal combustion engines with such turbocharger of small flow rate involve a problem that an excessive increase in exhaust pressure under conditions of large flow rate at the time of high rotation or the like brings about a decrease in output, which is accompanied with an increase in pumping loss, and degradation in knocking performance, which is accompanied with an increase in residual gases.

In order to cope with such problem, JP-A-10-220256 discloses a technology, in which a turbocharger having relatively large flow rate-supercharging pressure characteristics is mounted on an internal combustion engine to avoid various problems caused by an excessive increase in exhaust pressure and a variable intake valve is controlled to avoid influences of turbo-lag, which is deteriorated in accordance with an increase in flow rate. Further, JP-A-10-220256 discloses a technology, in which mirror cycle is performed by controlling a variable intake valve to make an actual compression ratio smaller than an actual expansion ratio when a waste-gate valve is opened in large flow rate under conditions of medium-high speed operation, thereby avoiding knocking.

With the technology disclosed in JP-A-10-220256, since a turbocharger of relatively large flow rate is used, conditions of acceleration from low speed are conditions of low flow rate for the turbocharger under, so that sufficient supercharging cannot be performed. With an internal combustion engine, in which a turbocharger is mounted to decrease a cylinder volume of the internal combustion engine, it is necessary to rapidly realize an output performance corresponding to a state of supercharging. Therefore, in the case where torque required to an engine is large as at the time of acceleration, there is caused a problem that an intake air quantity required to realize a required torque cannot be ensured only by controlling a variable intake valve and an output performance cannot be satisfied. Also, with the system of the publication, in which a turbocharger having fixed flow rate-supercharging pressure characteristics is used, when a waste-gate valve is opened in large flow rate under conditions of medium-high speed operation, an intake valve closing angle cannot be changed much for a required intake air quantity since control of an intake valve has considerable influences on an intake air quantity even in the case where an intake valve closing timing is controlled to avoid knocking while mirror cycle is performed. Therefore, there is caused a problem that a fuel saving benefit owing to mirror cycle and an effect of avoiding knocking cannot be produced adequately. Further, supercharging pressure is liable to become unstable under conditions of low flow rate for a turbocharger and so the technology disclosed in JP-A-10-220256, in which such region is frequently used, involves a problem that it is difficult to accurately control torque.

BRIEF SUMMARY OF THE INVENTION

The invention has been thought of in view of the problems and has its object to provide a control device for internal combustion engines comprising a turbocharger of variable flow rate and an intake valve with a variable mechanism, which control device exercises cooperative control of the turbocharger and the intake valve to achieve a simultaneous improvement in performance of fuel consumption and performance of acceleration.

In order to attain the object, the invention provides a control device for internal combustion engines, which comprise a turbocharger, of which turbo flow rate is made variable, and an intake valve provided with a variable valve mechanism and in which mirror cycle is performed, the control device comprising: means, which calculates an intake air quantity per unit time and an intake air quantity per cycle on the basis of torque required to the internal combustion engine; means, which controls the turbocharger so that with the intake air quantity per unit time, supercharging pressure is further increased in that range, in which a ratio of supercharging pressure and exhaust pressure is equal to or less than a predetermined value; and means, which controls the variable valve mechanism on the basis of the supercharging pressure and the intake air quantity per cycle.

According to the invention, it is possible to set a turbocharger and a variable intake valve so as to achieve an improvement in fuel consumption while meeting an intake air quantity required to an internal combustion engine. In an internal combustion engine, in which mirror cycle is performed, an improvement in fuel consumption is achieved by causing a variable intake valve to perform early closing or late closing but an intake air quantity sufficient to realize torque as required cannot be ensured because of a decrease in actual stroke volume. For this, application of a turbocharger is effective and a fuel saving benefit owing to mirror cycle can be expected while a supercharging effect brings about an increase in intake air quantity to ensure a target intake air quantity. Since the flow rate-supercharging pressure characteristic is fixed in ordinary turbochargers, however, supercharging pressure is determined singly for a target intake air quantity. When supercharging pressure is determined, a controlled variable of a variable intake valve for realization of a target intake air quantity is determined, so that an operating condition for production of mirror cycle effect is limited to a particular region. Here, by using a turbocharger, of which turbo flow rate is made variable, and a variable intake valve in combination to control the turbocharger so that for a particular target intake air quantity, supercharging pressure is increased in a range in which a ratio of supercharging pressure and exhaust pressure is equal to or less than a predetermined value, it is possible to realize that operating condition, under which a fuel consumption effect can be produced to the maximum by mirror cycle, in a wide range. The reason why the ratio of supercharging pressure and exhaust pressure is limited to a range within the predetermined value is that in a region in which exhaust pressure considerably increases as compared with supercharging pressure, pumping loss in intake and exhaust processes becomes large to bring about a decrease in fuel saving benefit determined by the relationship, which offsets the fuel saving benefit of mirror cycle. Also, since a variable intake valve is controlled on the basis of a target intake air quantity and supercharging pressure, it is possible to accurately realize torque as required.

Other objects, features and advantages of the invention will become apparent from the following description of the embodiments of the invention taken in conjunction with the accompanying drawings.

BRIEF DESCRIPTION OF THE DRAWINGS

FIGS. 4A and 4B are views illustrating the construction of a turbocharger, which is realized by a further system and in which flow rate-supercharging pressure characteristics are variable;

FIG. 4 is applied to an internal combustion engine;

FIGS. 6A and 6B are views illustrating a method of operating a variable valve, of which lift and phase are variable;

FIG. 13 is a view illustrating means for calculating a turbine axial rotating speed on the basis of quantities of before-after states of a compressor and an exhaust turbine in a variable turbocharger;

DESCRIPTION OF THE PREFERRED EMBODIMENT

Embodiments of the invention will be described hereinafter with reference to the drawings.

Figure 1:
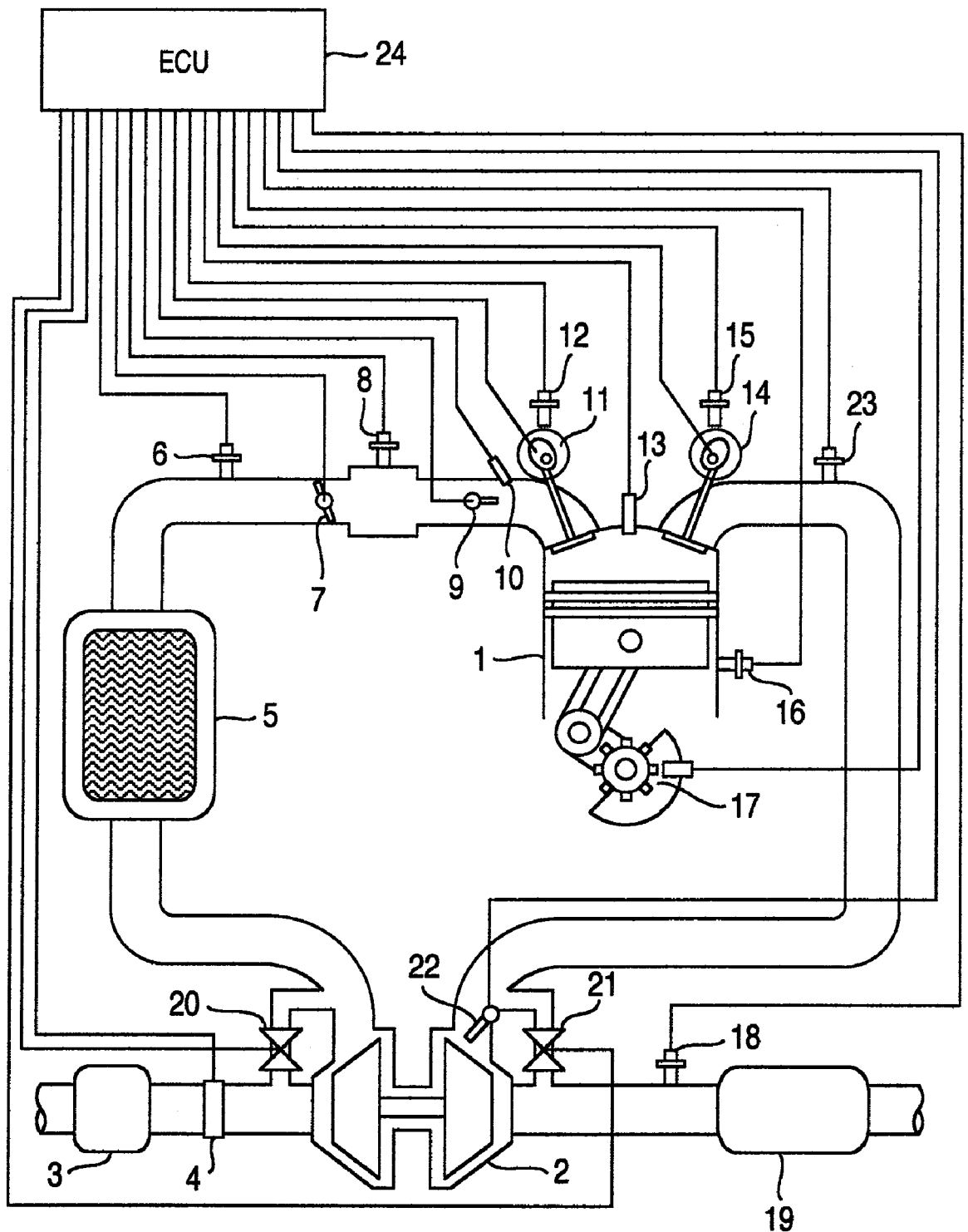
FIG. 1 is a view illustrating a first embodiment of the invention.

FIG. 1 is a view illustrating a first embodiment of the invention. A system according to the embodiment comprises an internal combustion engine 1. An intake flow passage and an exhaust flow passage are communicated with the internal combustion engine 1. An air cleaner 3 is connected to an upstream portion of the intake flow passage. An airflow sensor 4 is mounted downstream of the air cleaner to measure a flow rate of gases passing through the intake flow passage. A variable turbocharger 2 is connected to the intake flow passage and the exhaust flow passage. The variable turbocharger 2 comprises an exhaust gas turbine, by which energy of exhaust gases is converted into rotary motion of turbine blades, and a compressor, of which compressor blades connected to the turbine blades rotate to compress an intake air. A variable turbocharger means one capable of varying the relationship (turbo flow rate–supercharging pressure characteristics) between supercharging pressure and a turbo flow rate.

The compressor is connected to the intake flow passage and the turbine is connected to the exhaust flow passage. An intercooler 5 is provided downstream of the variable turbocharger 2 toward the compressor and the intercooler 5 serves to cool an intake air of which temperature is raised by adiabatic compression. An intake temperature sensor 6 is mounted downstream of the intercooler 5 and the intake temperature sensor 6 measures temperature of an intake air flowing into a cylinder. A throttle valve 7 is provided downstream of the intake temperature sensor 6 and the throttle valve 7 throttles the intake flow passage to control the quantity of an intake air flowing into the cylinder. An intake pressure sensor 8 is mounted downstream of the throttle valve 7 and the intake pressure sensor 8 measures a pressure in an intake manifold. A tumble control valve 9 is provided in an intake port and the tumble control valve 9 generates deviation in flow of gases flowing into the cylinder to form longitudinal vortexes in in-cylinder flow to strengthen turbulence. In addition, a swirl control valve, which forms transverse vortexes in in-cylinder flow to strengthen turbulence, may be used as the tumble control valve 9. The quantity of an intake air supplied into the cylinder is calculated on the basis of respective sensor output values of the airflow sensor 4, the intake temperature sensor 6, the intake pressure sensor 8, etc. and a valve opening degree of the throttle valve 7. A port jet type injector (injector 10) is provided to spray a fuel according to the quantity of an intake air to achieve a predetermined air-fuel ratio, thus forming a combustible air-fuel mixture. In addition, instead of using a port jet type injector, it will do to use an in-cylinder direct jet type injector, which sprays a fuel directly into a cylinder. A variable intake valve 11 is provided on the cylinder and the variable intake valve 11 provided with a variable mechanism can optionally control an opening and closing timing and a valve lift. An intake cam angle sensor 12 is provided to detect a controlled state of the variable intake valve 11. A combustible air-fuel mixture fed to the cylinder is compressed by a piston and an ignition plug 13 ignites the air-fuel mixture in a timing, in which the piston reaches the neighbor of an upper dead center. When the piston descends to reach the neighbor of a lower dead center, an exhaust valve 14 opens to permit combustion gases to be discharged into an exhaust pipe. The exhaust valve includes a variable exhaust valve 14 capable of optionally controlling the opening and closing timing and an exhaust cam angle sensor 15, which detects a controlled variable of the exhaust valve, is mounted.

That timing, in which the ignition plug 13 ignites the air-fuel mixture, is ordinarily set to MBT (minimum spark advance for best torque), in which torque applied through a crank mechanism on a crank shaft by combustion pressure becomes maximum. Under a high-load operating condition, when ignition timing is set to MBT, end gases in the cylinder are self-ignited without waiting for flaming and generate irregular combustion called knocking in some cases. A knocking sensor 16 is mounted to the cylinder and the knocking sensor 16 detects the presence of knocking on the basis of pressure oscillation caused by knocking. When knocking occurs, ignition timing is lag-angle-corrected until knocking does not occur. High-temperature, high-pressure exhaust gases discharged from the cylinder are led into an exhaust turbine inlet of the variable turbocharger 2 through the exhaust pipe. After doing work on turbine blades in the exhaust turbine, exhaust gases, of which pressure is decreased, are discharged from an exhaust turbine outlet. An air-fuel ratio sensor 18 is mounted downstream of the exhaust turbine and detects an air-fuel ratio of unburned gases. An air-fuel ratio of an air-fuel mixture fed in the cylinder is detected based on an output value of the air-fuel ratio sensor 18 and the quantity of a fuel sprayed from the injector 10 is corrected on the basis of a difference between a target control value of an air-fuel ratio and an actual value so as to become a target control amount. An exhaust purifying catalyst 19 is provided downstream of the air-fuel ratio sensor 18 and the exhaust purifying catalyst 19 purifies harmful matters in exhaust gases. After passing through the exhaust purifying catalyst, exhaust gases are subjected to noise reduction treatment by a muffler to be discharged to the atmosphere. Also, a crank angle sensor is provided on the crank shaft and the crank angle sensor 17 measures a crank angle and a crank rotating speed.

The variable turbocharger 2 is provided with an air bypass valve 20 and a waste-gate valve 21. The air bypass valve 20 is provided to prevent an excessive increase in pressure prevailing from a downstream region of the compressor to an upstream region of the throttle valve 7. By opening the air bypass valve 20 when the throttle valve 7 is quickly closed in a supercharged state, gases in the downstream region of the compressor are caused to counterflow to an upstream region of the compressor, thus enabling decreasing the supercharging pressure. On the other hand, the waste-gate valve 21 is provided to prevent the internal combustion engine 1 from being put in an excessive supercharged level. When the supercharging pressure detected by the intake pressure sensor 8 reaches a predetermined value, the waste-gate valve 21 is opened whereby exhaust gases are guided so as to bypass the exhaust turbine, thus enabling suppressing or maintaining supercharging. A flap vane 22 capable of optionally changing an area of an exhaust turbine inlet nozzle is provided at the exhaust turbine inlet of the variable turbocharger 2. When the quantity of an intake air in the internal combustion engine 1 is small as in a low-speed operation or the like, the flap vane 22 is throttled whereby there are caused an increase in exhaust pressure and an increase in exhaust flow rate. On the other hand, under a large flow rate condition as in a high-speed operation or the like, the flap vane 22 is opened in order to prevent an excessive rise in exhaust pressure. By controlling the flap vane 22 in this manner, the turbocharger is held high in efficiency even under a wide flow rate condition. Exhaust gases having passed through the nozzle portion are introduced into exhaust turbine blades. Also, an exhaust pressure sensor 23 is mounted upstream of the exhaust turbine and the exhaust pressure sensor detects an exhaust pressure and is used in controlling opening and closing of the flap vane 22.

The system according to the embodiment comprises an ECU (Electronic Control Unit) 24 as shown in FIG. 1. The various sensors described above are connected to the ECU 24. Also, actuators such as the throttle valve 7, the injector 10, the variable intake valve 11, the variable exhaust valve 14, etc. are connected to the ECU 24. Analog signals output from the various sensors described above are input into the ECU 24 and so operation working points of the internal combustion engine 1 are detected on the basis of various sensor values. The operation working points include, for example, the rotating speed and a load of the internal combustion engine 1, etc. Target control amounts of the actuators, which correspond to the operation working points, are calculated according to the control program mounted on the ECU 24, and control signals are output to the actuators so as to obtain the target control amounts. In calculating the actuator control amounts, influences of an external environment such as outside air temperature, etc. and an operation working mode at the start in addition to the operation working points of the internal combustion engine 1 are appropriately taken account of.

Figure 2A:
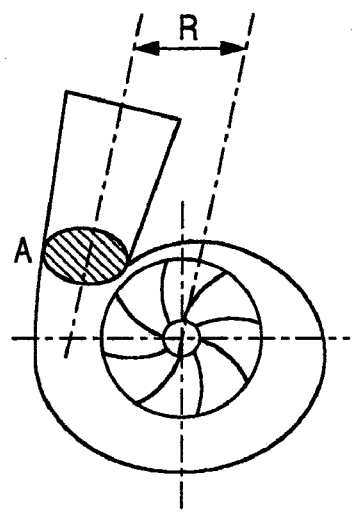
FIGS. 2A and 2B are views illustrating the relationship between an area A of an exhaust turbine inlet nozzle and a distance R from an exhaust turbine inlet position to an axial center of an exhaust turbine, which constitute important factors to characterize the flow rate-supercharging pressure characteristics of a turbocharger.
Figure 2B:
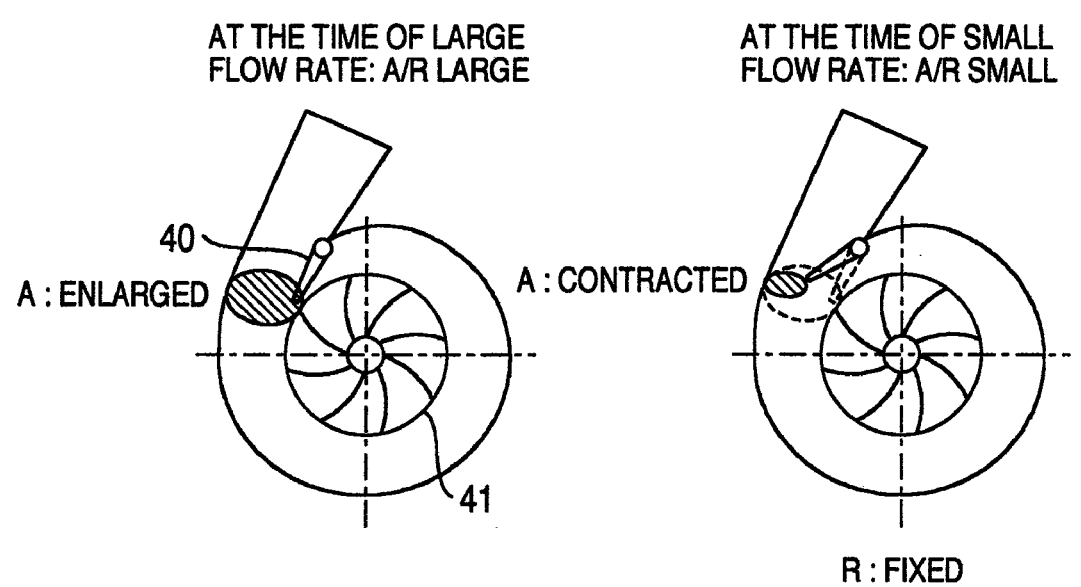

FIG. 2A is a view illustrating the relationship between an area A of an exhaust turbine inlet nozzle and a distance R from an exhaust turbine inlet position to an axial center of an exhaust turbine 41, which constitute important factors to characterize the flow rate-supercharging pressure characteristics of a variable turbocharger. FIG. 2B is a view illustrating a method of operating a variable turbocharger, in which the ratio A/R of A and R is varied. At the time of small flow rate, a vane 40, which is called flap vane, is operated to a closed side to contract a nozzle area and at the time of large flow rate, the vane 40 is opened to enlarge a nozzle area. A/R can be varied by operating the flap vane in this manner.

Figure 3A:
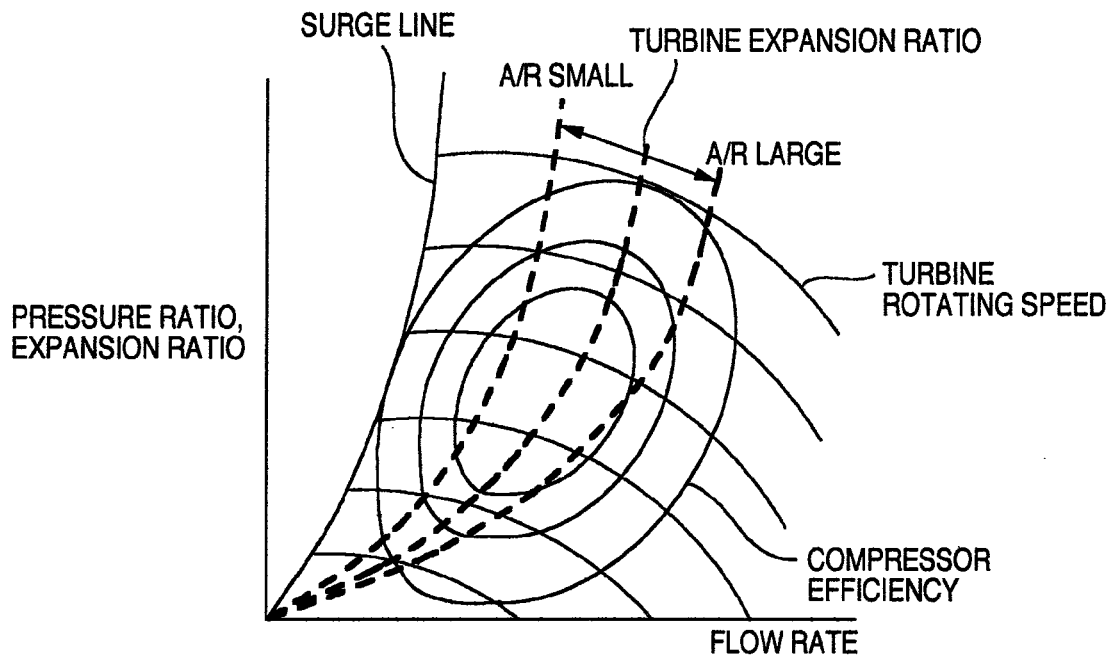
FIGS. 3A and 3B are views illustrating a flow rate-supercharging pressure characteristic map of a turbocharger, which is varied by making A/R variable.
Figure 3B:
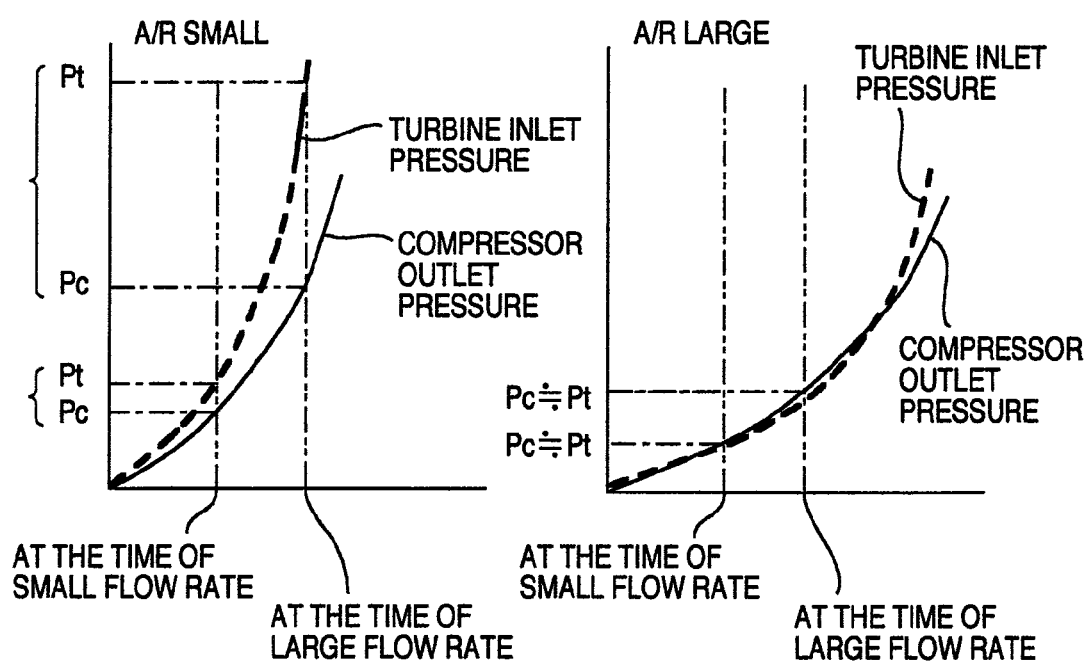

FIGS. 3A and 3B are views illustrating a flow rate-supercharging pressure characteristic map of a variable turbocharger, which is varied by making the A/R variable. The performance characteristic of a variable turbocharger is determined by matching between an exhaust turbine performance and a compressor performance. The performance of a compressor is represented by a two-dimensional map, in which an abscissa indicates a flow rate and an ordinate indicates a pressure ratio (compressor outlet pressure/compressor inlet pressure). It is possible to obtain compressor efficiency and a turbine rotating speed from flow rate and pressure ratio. A surge line is described in a compressor map and a turbocharger becomes unstable in a region having a smaller flow rate than that on the boundary. When a throttle valve is closed just after supercharging is performed, an operation working point enters the region in some cases. In order to suppress an instability phenomenon, an operation of opening an air bypass valve to release a supercharging pressure is performed. Also, the performance of an exhaust turbine is represented by a two-dimensional map, in which an abscissa indicates a flow rate and an ordinate indicates an expansion ratio (turbine inlet pressure/turbine outlet pressure). Since influences, which the rotating speed of a turbine has on the relationship between a flow rate and an expansion ratio of an exhaust turbine, are relatively small, they are not shown in the FIG. 3B. Also, an exhaust turbine efficiency as a parameter representative of an exhaust turbine performance is omitted in the description of the present application. In designing a turbocharger, matching between a compressor flow rate and an exhaust turbine flow rate is performed in addition to matching with a flow rate based on a cylinder volume of an internal combustion engine. When A/R illustrated in FIG. 2A is variable, a flow rate-expansion ratio curve of an exhaust turbine is changed on the compressor map as shown in FIG. 3A. Given such change, it is possible to change the relationship between a supercharging pressure in a cylinder upstream region and an exhaust pressure in a cylinder downstream region in an internal combustion engine. FIG. 3B illustrates the relationship between a compressor outlet pressure Pc (solid line) and a turbine inlet pressure Pt (broken line) in the case where A/R is increased and decreased. In a low-speed and low-load operating state of an internal combustion engine, a flow rate through a turbocharger is small since the quantity of an intake air is small. Therefore, when A/R is set to be large, Pt does not rise with the result that Pc does not rise. In such case, Pt and Pc can be raised by closing a flap vane to set A/R to be small. On the other hand, in a high-speed and high-load operating state of an internal combustion engine, the quantity of an intake air increases and Pt rises excessively in a state in which A/R is set to be small, so that the internal combustion engine is degraded in scavenging efficiency. By opening a flap vane and increasing A/R, it is possible to restrict Pt to an appropriate value, thus enabling ensuring a sufficient supercharging pressure and preventing degradation in scavenging efficiency.

FIGS. 4A and 4B are views illustrating the construction of a turbocharger, which is realized by a further system and in which flow rate-supercharging pressure characteristics are variable. A plurality of variable nozzle vanes 42 is arranged on an outer periphery of an exhaust turbine. A turbocharger, in which the flow rate-supercharging pressure characteristics illustrated in FIGS. 3A and 3B are variable, can be realized by performing the opening and closing operation of the variable nozzle vanes. Also, an operation working point of the turbocharger can be always held at an efficient point by appropriately adjusting the opening degree of the variable nozzle vanes according to the quantity of an intake air in an internal combustion engine. Plural constructions of a turbocharger, in which flow rate-supercharging pressure characteristics are made variable, have been proposed, and any one of turbocharger systems, in which similar effects are aimed at, is also applicable to the system of the embodiment.

Figure 5:
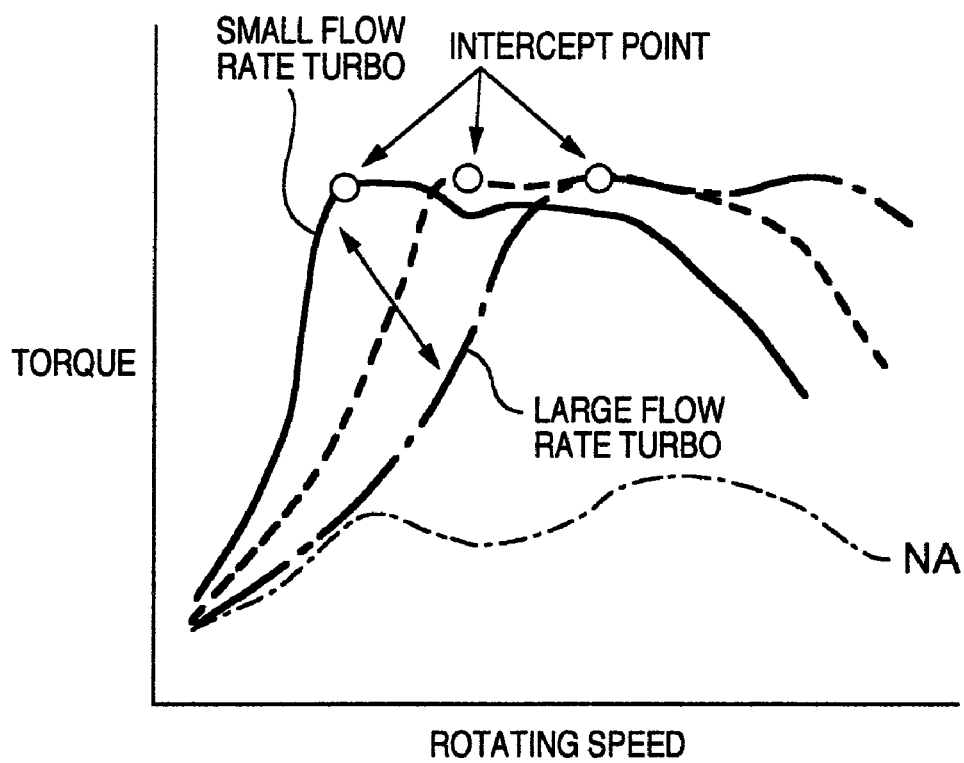
FIG. 5 is a view illustrating the tendency of a full opening torque performance in the case where the variable turbocharger illustrated in FIG. 2

FIG. 5 is a view illustrating the tendency of a full opening torque performance in the case where the variable turbocharger illustrated in FIGS. 2A and 2B or FIGS. 4A and 4B is applied to an internal combustion engine. A curve indicated by a thick line shows the case where a turbocharger is mounted, and a curve indicated by a thin, alternate long and short dash line shows a full opening torque curve in case of an internal combustion engine NA, in which a turbocharger is not mounted. As an internal combustion engine is increased in rotating speed, supercharging pressure rises and torque increases. With a rotating speed, at which supercharging pressure reaches a predetermined value, as a boundary, a waste-gate valve is opened to maintain the supercharging pressure at a constant value. The waste-gate valve comprises an electromagnetic valve and intermittently opens and closes operatively. Intake pressure is controlled by varying the ratio (duty ratio) of current-carrying time in the duration of opening and closing. Instead of an electromagnetic valve, a mechanical mechanism may be provided, in which the opening and closing operation of a waste-gate valve is performed with supercharging pressure as a drive source. A point, at which the waste-gate valve is opened, is called an intercept point. In case of using a small-flow rate turbocharger, an increase in torque exhibits itself in a further low rotating speed region while a decrease in torque is found in a high rotating speed region. This is because degradation in scavenging efficiency is caused by an excessive increase in exhaust pressure as illustrated in FIGS. 3A and 3B. On the other hand, with a large-flow rate turbocharger, the rotating speed up to the intercept point shifts further toward a high rotation side but it is possible to inhibit a decrease in torque in a high rotating speed region. In this manner, there is known a technology, in which a full opening torque performance is improved by varying the flow rate of a turbocharger according to the quantity of an intake air in an internal combustion engine.

FIGS. 6A and 6B are views illustrating a method of operating a variable valve, of which lift and phase are continuously varied. A variable valve used in the system according to the embodiment comprises an intake valve including a mechanical mechanism, by which lift is made continuously variable, and a mechanical mechanism, by which phase is made variable, and can considerably change only a closing timing without substantially changing an opened timing of the valve as shown in FIG. 6B. By changing only a valve closing timing, a period of time, during which a piston of an internal combustion engine compresses an air-fuel mixture, is changed, so that it is possible to change an actual compression ratio. By reducing an actual compression ratio relative to an expansion ratio, it is possible to realize a mirror cycle to achieve a decrease in fuel consumption rate. Reduction in actual compression ratio produces not only the effect of a mirror cycle but also is effective as knocking avoiding measures and makes it possible to further achieve spark advance in ignition timing, so that it is possible to expect an improvement in fuel consumption. However, reduction in actual compression ratio leads to a simultaneous reduction in combustion chamber volume, so that the quantity of an intake air decreases and torque decreases. Therefore, in order to ensure an output performance through an increase in in-cylinder pressure in a valve closing timing, the valve is used together with a turbocharger. In addition, a sensor capable of detecting an operating amount of the variable valve mechanism is mounted on the variable valve mechanism and it is possible to momentarily detect the opening duration and opening timing of the valve. An intake air is appropriately controlled on the basis of these information. Also, while the system according to the embodiment is constructed to use a variable valve mechanism based on a mechanical mechanism, the invention is not limited thereto. That is, the same effect can be also produced by application of an electromagnetically driven, variable intake valve. Also, while the system according to the embodiment uses a variable valve mechanism, of which lift and phase are continuously variable, the invention is not limited thereto. That is, it is possible to apply a variable valve mechanism, of which lift and phase are stepwise variable, and a variable valve mechanism, of which only lift is continuously variable.

Figure 7:
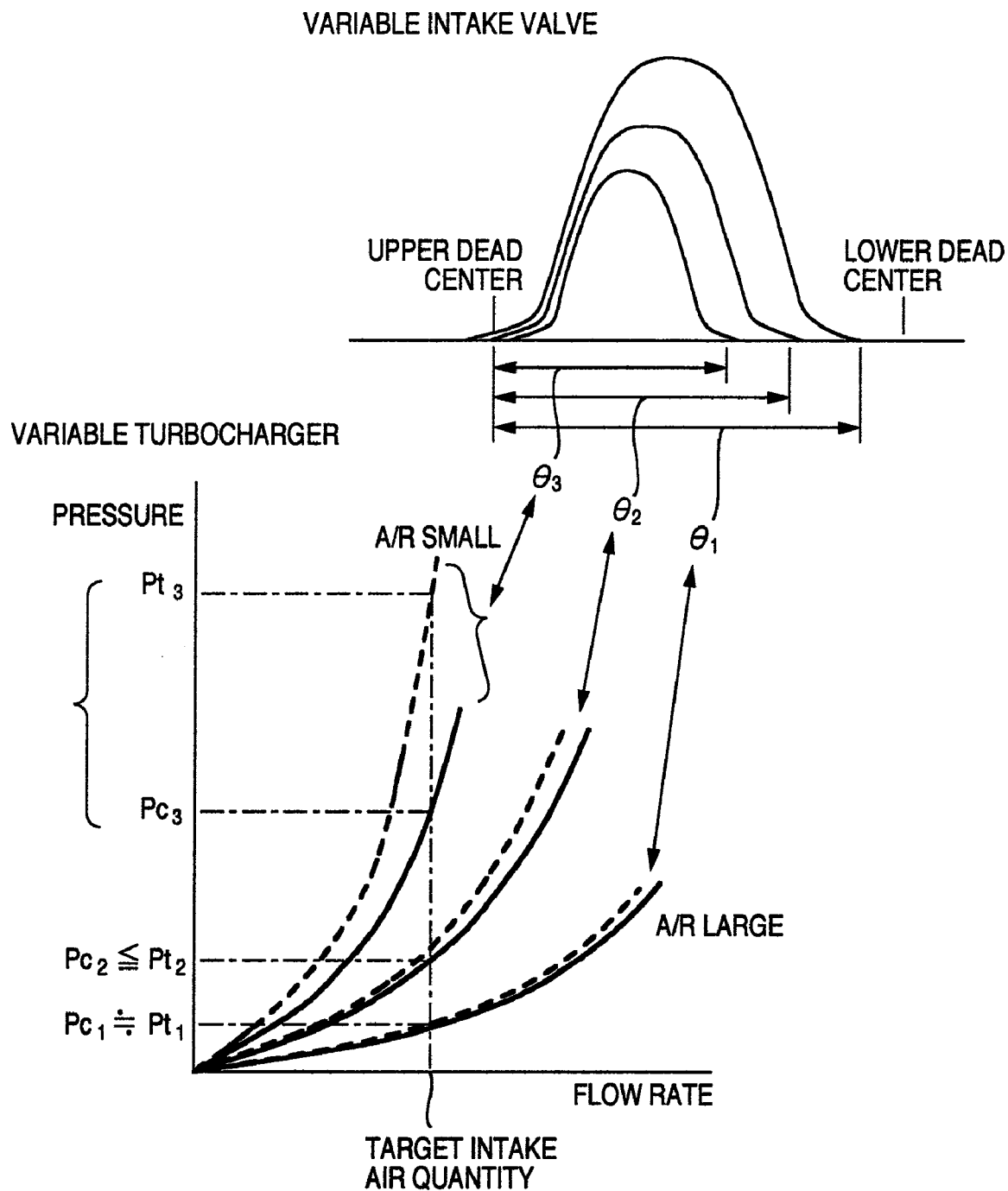
FIG. 7 is a view illustrating a method of combining and controlling a variable intake valve and a variable turbocharger in mirror cycle.

FIG. 7 is a view illustrating a control method in the case where a variable intake valve and a variable turbocharger are combined together in mirror cycle. When a duration, in which the variable intake valve is opened, is decreased as $\theta_1 \rightarrow \theta_2 \rightarrow \theta_3$, a compression ratio is decreased relative to an expansion ratio due to an early intake closing, so that an effect of fuel saving benefit owing to the mirror cycle is increased. In order to ensure a predetermined quantity of an air fed to a cylinder, it is required that a turbocharger perform supercharging. At this time, it is necessary to change a supercharging pressure according to valve opened duration. FIG. 7 illustrates a combination of a closing angle of a variable intake valve, by which a target air quantity is realized, and A/R of a variable turbocharger. With the same target intake air quantity, an increase of supercharging pressure is required as a valve opened duration decreases. In order to increase a supercharging pressure with a flow rate being constant, A/R is reduced in the embodiment. With a large-flow rate turbocharger having a large A/R, supercharging pressure $Pc_1$ and exhaust pressure $Pt_1$ are substantially in the same level. As A/R is decreased, both supercharging pressure and exhaust pressure increase, but when A/R is set to be equal to or less than a predetermined value, the rate at which exhaust pressure $Pt_3$ rises, becomes considerably large as compared with supercharging pressure $Pc_3$.

Figure 8:
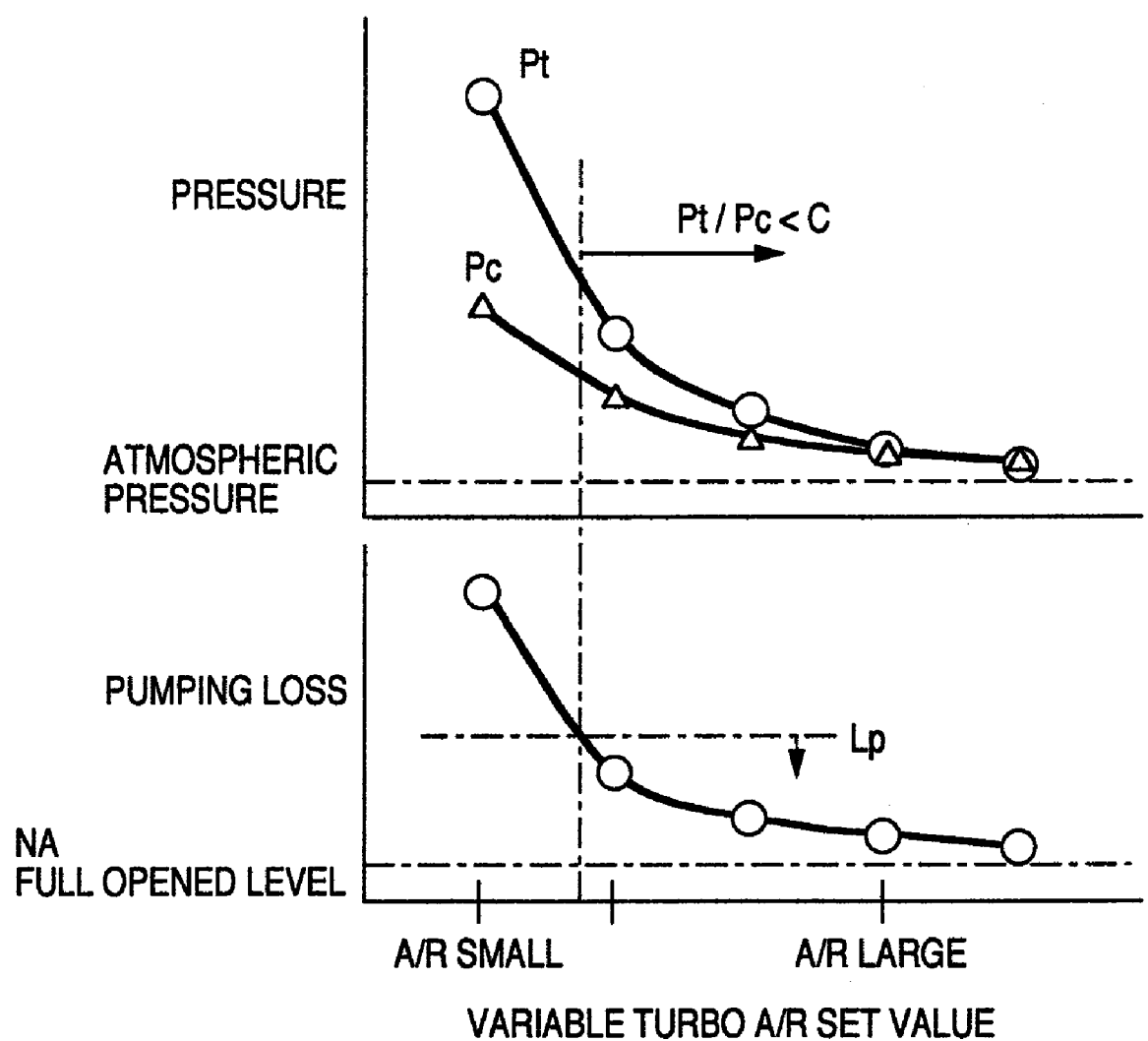
FIG. 8 is a view illustrating the tendency of supercharging pressure Pc, exhaust pressure Pt, and pumping loss depending upon a set value of A/R.

FIG. 8 is a view illustrating the tendency of supercharging pressure Pc, exhaust pressure Pt, and pumping loss depending upon a set value of A/R. As A/R is decreased, a ratio Pt/Pc of supercharging pressure Pc and exhaust pressure Pt increases in value. Pumping loss is characterized by a Pt/Pc value. Since a tolerance of a Pt/Pc value, which makes pumping loss equal to or less than a permissible value Lp, is given by Pt/Pc≦C, A/R meeting the conditions therefor is found.

Figure 9:
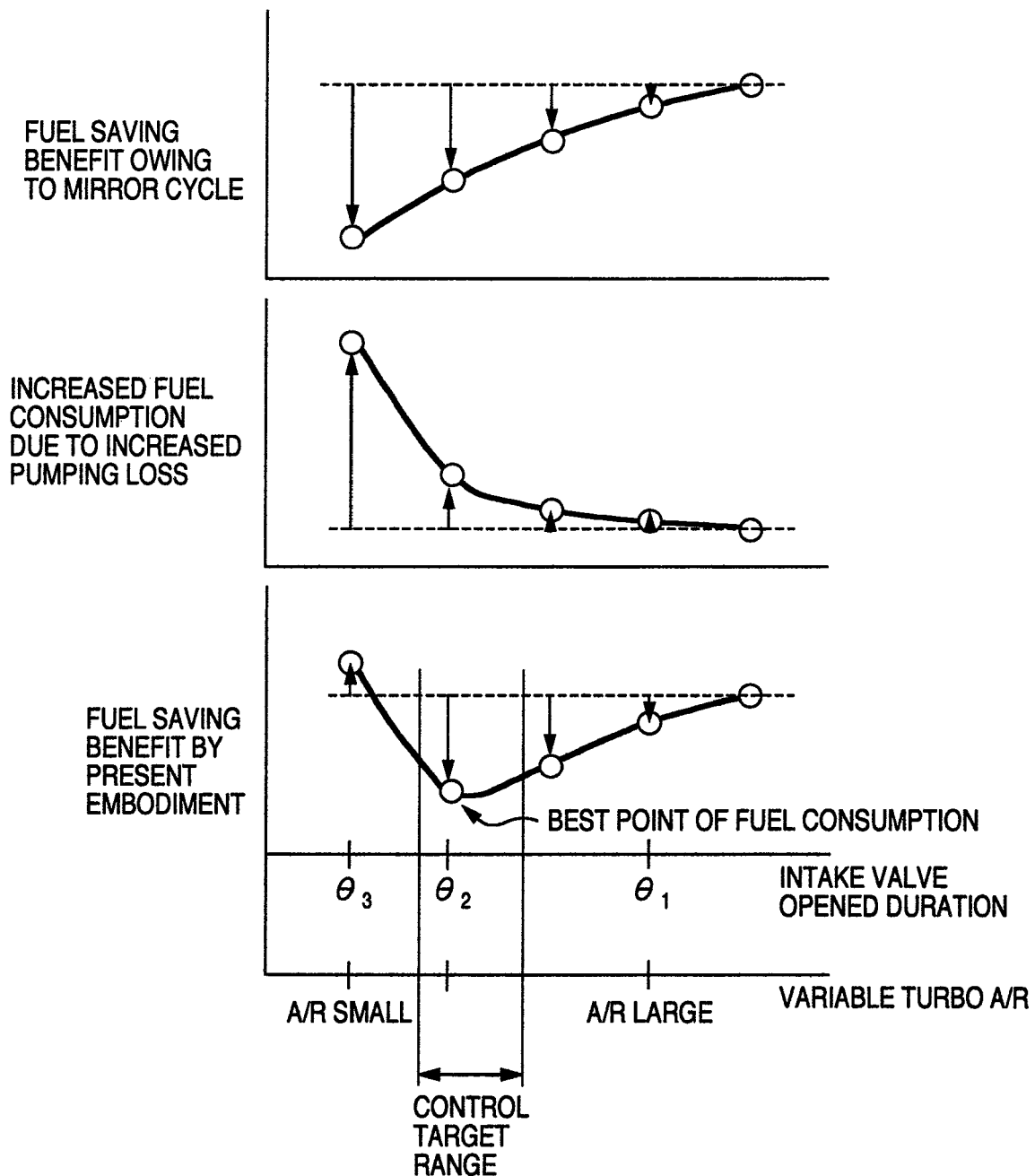
FIG. 9 is a view illustrating a method for cooperative control of a variable intake valve and a variable turbocharger in order to realize a decrease in fuel consumption.

FIG. 9 is a view illustrating a method for cooperative control of a variable intake valve and a variable turbocharger in order to realize a reduction of fuel consumption. A fuel saving benefit is increased by using the variable intake valve to perform an early closing mirror cycle. Also, when A/R of the variable turbocharger is reduced in order to ensure the quantity of an intake air, pumping loss is considerably increased in a region beyond a predetermined value. Accordingly, in the system according to the embodiment, which comprises both the variable intake valve and the variable turbocharger, a fuel saving benefit can be produced to the maximum by setting their control amounts on the basis of the mirror cycle fuel saving benefit and the fuel consumption increase due to pumping loss. In the case where an operation working point of an internal combustion engine changes, the variable intake valve and the variable turbocharger can be held at the best point of fuel consumption by setting A/R so that the supercharging pressure Pc becomes maximum in a range in which the relationship between the supercharging pressure Pc and the exhaust pressure Pt is Pt/Pc≦C.

Figure 10A:
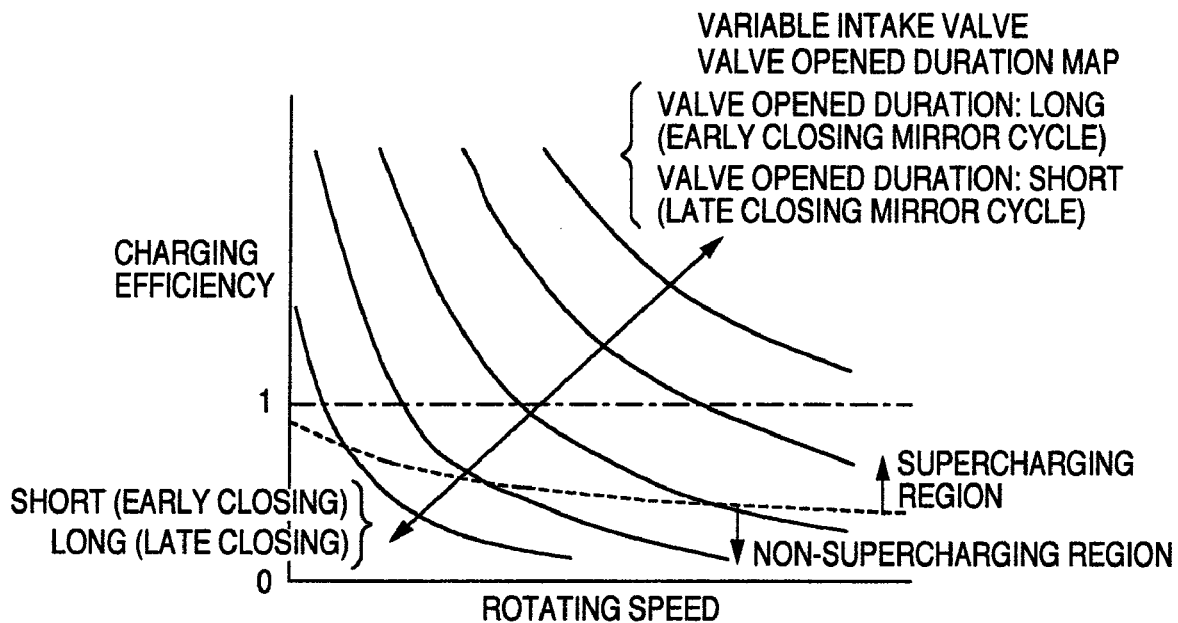
FIGS. 10A and 10B are views illustrating a valve opened duration of a variable intake valve and respective control maps of A/R of a variable turbocharger in an internal combustion engine, which comprises the variable intake valve and the variable turbocharger and in which mirror cycle is performed.
Figure 10B:
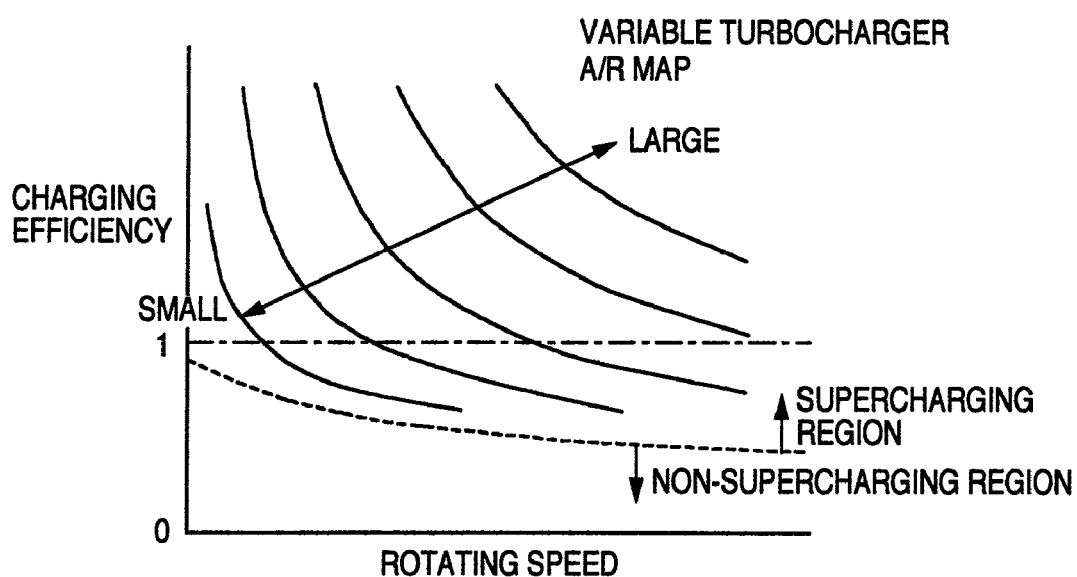

FIGS. 10A and 10B are views illustrating control maps of valve opened duration of the variable intake valve and A/R of the variable turbocharger in the internal combustion engine, which comprises the variable intake valve and the variable turbocharger and in which mirror cycle is performed. The respective control maps comprise a two-dimensional map, in which a rotating speed and a charging efficiency are indicated by axes. The variable intake valve is shown for two cases, that is, an early closing mirror cycle and a late closing mirror cycle. Broken lines in the maps indicate a border of a supercharging region, in which a supercharger works and an intake pipe pressure becomes large as compared with the atmosphere, and supercharging and mirror cycle are performed simultaneously in a region in which a charging efficiency is equal to or less than 1, in the system according to the embodiment. In case of an early closing mirror cycle, the longer a valve opened duration, the higher a charging efficiency, and in case of a late closing mirror cycle, the shorter a valve opened duration, the higher a charging efficiency. By adopting such control method, an improvement in fuel consumption can be achieved even in a relatively high load region. A minimum value of the intake valve opened duration in an early closing mirror cycle is approximately 90 degrees or so and a maximum value is around 240 degrees. On the other hand, setting of a minimum value of 180 degrees and a maximum value of around 300 degrees is preferable in a late closing mirror cycle. No matter whether an early closing mirror cycle or a late closing mirror cycle is performed, a variable turbocharger is preferably set according to the quantity of an intake air per unit time as shown in FIG. 10B. Both map data are beforehand adapted in the stage of development of an internal combustion engine so as to be set to a control target range illustrated in FIG. 9 and recorded in a memory of ECU. In an operating state except that at the time of quick acceleration and deceleration, data on the maps, which are based on a rotating speed and a charging efficiency as detected, are referred to and A/R and a variable valve are controlled to optimum values at all times.

Figure 11:
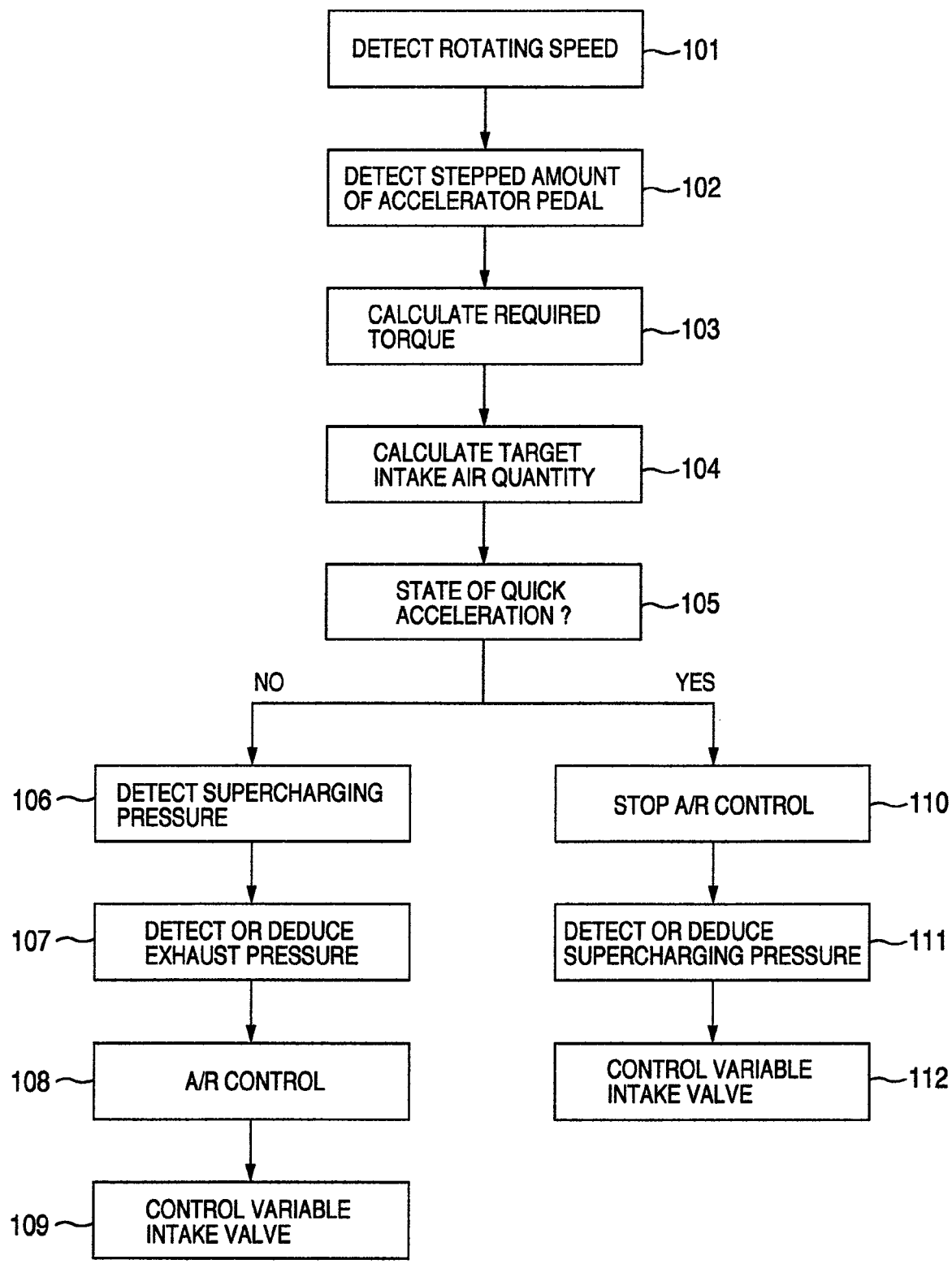
FIG. 11 is a view illustrating that control logic of a variable intake valve and a variable turbocharger, which is executed in a control software product of ECU.

FIG. 11 is a view illustrating that control logic of the variable intake valve and the variable turbocharger, which is executed in a control software product of ECU. In STEP 101, the rotating speed of the internal combustion engine is detected. The rotating speed can be found by a pulse signal of a crank angle sensor mounted to a crank. In STEP 102, a stepped amount of an accelerator pedal is detected. Based on the stepped amount of the accelerator pedal, torque required by a driver is calculated in STEP 103. In STEP 104, that quantity of an intake air per unit time and per cycle, which is required to realize the torque required by a driver, is calculated. In STEP 105, it is discriminated on the basis of a state, in which the accelerator pedal is operated by the driver, whether the internal combustion engine is put in a state of quick acceleration. When put in a state of steady or gentle acceleration other than the state of quick acceleration, the procedure proceeds to STEP 106. In STEP 106, supercharging pressure is detected on the basis of an output signal of an intake pressure sensor provided on an intake pipe. With the system according to the embodiment, a pressure sensor is provided on an exhaust pipe upstream of an exhaust turbine to detect an exhaust pressure in STEP 107. Also, it is also possible to deduce an exhaust pressure on the basis of the quantity of an intake air and the opening degree of a waste-gate valve. A method of deducing an exhaust pressure will be described hereinafter with reference to FIG. 13. In STEP 108, A/R of the variable turbocharger is controlled by the relationship between supercharging pressure Pc and exhaust pressure Pt, which are detected or deduced in STEP 106 and STEP 107. At this time, out of various combinations of a variable intake valve opened duration and A/R, a control amount of A/R is determined so that Pc becomes maximum in a range, in which the relationship of Pt/Pc≦C is met. A control amount of A/R is recorded, as map data illustrated in FIG. 10, in a memory of ECU. When A/R is controlled, supercharging pressure is determined. Based on the supercharging pressure, a rotating speed, and a target intake air quantity, an opened duration of the variable intake valve is controlled in STEP 109. On the other hand, in case of being determined as being put in a state of quick acceleration, the procedure proceeds to STEP 110. In STEP 110, control of A/R is first stopped. Supercharging pressure is detected by a pressure sensor provided on an intake pipe. At this time, means, which deduces a transient change in turbine rotating speed to deduce supercharging pressure, may be used. A method of deducing a turbine rotating speed and supercharging pressure will be described hereinafter with reference to FIG. 13. Based on supercharging pressure, a rotating speed, and a target intake air quantity as obtained, control of a variable intake valve is executed in STEP 112.

Figure 12:
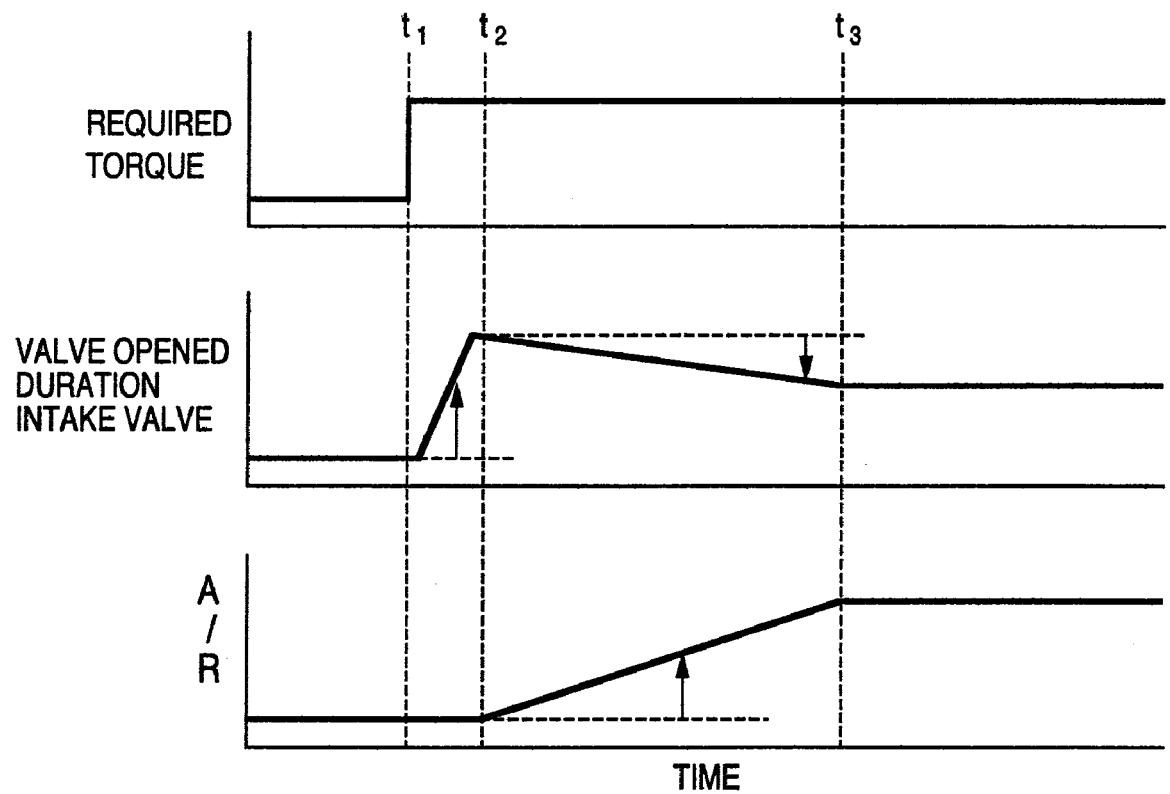
FIG. 12 is a time chart illustrating an intake valve opened duration and a method of controlling A/R when quick acceleration is made.

FIG. 12 is a time chart illustrating the intake valve opened duration and a method of controlling A/R when quick acceleration is made. At timing $t_1$, a driver steps on an accelerator pedal to perform quick acceleration. An opened duration of the intake valve is instantly increased meeting with a required torque, which increases stepwise. At this time, control of A/R of a variable turbocharger is stopped. At timing $t_2$, in which a target torque is reached, control of A/R begins. In this case, since the quantity of an intake air is increased, a flap vane is controlled so that A/R increases. Since supercharging pressure increases as A/R decreases (as A/R increases, supercharging pressure decreases), control is executed so that an opened duration of the intake valve is gradually decreased in order to maintain a charging efficiency in a constant state. At timing $t_3$, at which the relationship illustrated in FIG. 9 is established between the supercharging pressure and the exhaust pressure, the variable intake valve and the variable turbocharger are fixed in operation. The following can be listed as an advantage of adopting such control method. That is, a required torque can be accurately traced by using the variable valve, which is excellent in responsibility, to execute control of the intake air quantity at the time of quick acceleration. By controlling the variable turbocharger, which is relatively slow in speed of response, after quick acceleration and simultaneously controlling the variable intake valve at this time, shift to a state of optimum fuel consumption can be made without degradation in operability. In the supercharging region, A/R is always set to a side of minimum flow rate within a range, in which the fuel consumption is not degraded. Therefore, preferred conditions in torque control precision are realized since the turbocharger is always advantageous in responsibility and the turbocharger is stable in flow rate and supercharging pressure as compared with the case of being excessively set to a large flow rate side. The conditions preferred for the turbocharger are substantially equivalent to being controlled at an operation working point in the vicinity of an intercept point.

FIG. 13 is a view illustrating means for calculating a turbine axial rotating speed on the basis of quantities of before-after states of the compressor and the exhaust turbine in the variable turbocharger. Under the transient conditions illustrated in FIG. 12, an operation working point of the turbocharger changes transiently. In such case, in order to preferably control the variable turbocharger, it becomes necessary to deduce an operation working point of the turbocharger and to execute control based on the operation working point as deduced. Assuming that the quantities of before-after states of the compressor and the exhaust turbine are detected or deduced, the turbine axial rotating speed can be deduced by solving the following ordinary differential equation on the basis of power given to turbine vanes by exhaust gases, power given to an intake air by the compressor, and frictional power on a turbine shaft.

$$dNt^2/dt = C(1/Jt) \times (Lt - Lc - Lf) \quad (1)$$

Here, Nt indicates the rotating speed of the turbine shaft, t indicates time, C indicates a constant, Jt indicates a moment of inertia about the turbine shaft, Lt indicates power given to the turbine vanes by exhaust gases, Lc indicates power given to an intake air by the compressor, and Lf indicates frictional power on the turbine shaft. Power Lt given to the turbine vanes by exhaust gases can be calculated on the basis of turbine inlet pressure, turbine outlet pressure, turbine inlet temperature, mass flow rate passing through the turbine, and turbine efficiency. Also, power Lc given to the intake air by the compressor can be calculated on the basis of compressor inlet pressure, compressor outlet pressure, compressor inlet temperature, mass flow rate passing through the compressor, and compressor efficiency. Frictional power on the turbine shaft can be calculated on the basis of the turbine rotating speed. The relationship among compressor inlet and outlet pressure ratio, compressor flow rate, compressor efficiency, and turbine rotating speed is beforehand given as characteristics inherent to the compressor provided on the turbocharger by map data or a function. Further, the relationship among turbine inlet and outlet pressure ratio, turbine flow rate, turbine efficiency, and turbine rotating speed is beforehand given as characteristics inherent to the turbine provided on the turbocharger by map data or a function. Turbine shaft rotating speed Nt found by the equation (1) is used to enable deducing an operation working point of the turbocharger, which changes transiently.

The system according to the embodiment has a construction, in which supercharging pressure and exhaust pressure are detected directly by pressure sensors provided on intake and exhaust pipes. However, the provision of a sensor for detection of exhaust pressure is difficult in some cases from the viewpoint of heat resistance performance, and degradation in detection accuracy of supercharging pressure is caused in a transient state in some cases. Therefore, by providing means for deduction of supercharging pressure and exhaust pressure separately from the sensors, it is possible to preferably control the variable turbocharger on the basis of an operation working point of the turbocharger, which changes transiently. Using characters shown in FIG. 13, compressor outlet pressure Pco and temperature Tco can be deduced by the following equation.

$$dMco/dt = dMcoi/dt - dMcoo/dt - dMcoa/dt$$

$$dTco/dt = (1/(Mco \times Cp)) \times (dHcoi/dt - dHcoo/dt - dHcoa/dt - dQco/dt)$$

$$Pco = (Mco \times R \times Tco)/Vco \quad (2)$$

Here, Mco indicates mass of compressor outlet, Mcoi indicates mass flowing into the compressor outlet, Mcoo indicates mass flowing out of the compressor outlet, Mcoa indicates mass passing through the air bypass valve to outflow, Cp indicates specific heat capacity, Hco indicates enthalpy at the compressor outlet, Hcoi indicates enthalpy flowing into the compressor outlet, Hcoo indicates enthalpy flowing out of the compressor outlet, Hcoa indicates enthalpy passing through the air bypass valve to outflow, Qco indicates energy lost to wall surface at the compressor outlet portion, R indicates gas constant, and Vco indicates volume of the compressor outlet. Enthalpy Hcoi flowing into the compressor outlet takes account of work of compression by the compressor. Mcoi is found from the relationship between the throttle valve opening degree and the rotating speed. An output value of the airflow sensor may be used for Mcoi. It is possible to add an effect of the intercooler to Qco.

Likewise, turbine inlet pressure Pti and temperature Tti can be deduced by the following equation.

$$dMti/dt = dMtii/dt - dMtio/dt - dMtiw/dt$$

$$dTti/dt = (1/(Mti \times Cp)) \times (dHtii/dt - dHtio/dt - dHtiw/dt - dQti/dt)$$

$$Pti = (Mti \times R \times Tti)/Vti \quad (3)$$

Here, Mti indicates mass of the turbine inlet, Mtii indicates mass flowing into the turbine inlet, Mtio indicates mass flowing out of the turbine inlet, Mtiw indicates mass passing through the waste-gate valve to outflow, Cp indicates specific heat capacity, Hti indicates enthalpy at the turbine inlet, Htii indicates enthalpy flowing into the turbine inlet, Htio indicates enthalpy flowing out of the turbine inlet, Htiw indicates enthalpy passing through the waste-gate valve to outflow, Qti indicates energy lost to wall surface at the turbine inlet portion, R indicates gas constant, and Vti indicates volume of the turbine inlet. Enthalpy Hcoi flowing into the turbine inlet is enthalpy of gases discharged from all cylinders connected to the turbine. By means of time integration of the equations (1) to (3) in ECU when an internal combustion engine is put in a transient state, it is possible to deduce momentary changes in respective values. Steady-state values just before being put in the transient state are used as initial values in time integration. Respective steady-state values are beforehand stored as map data in a memory of ECU.

Figure 14:
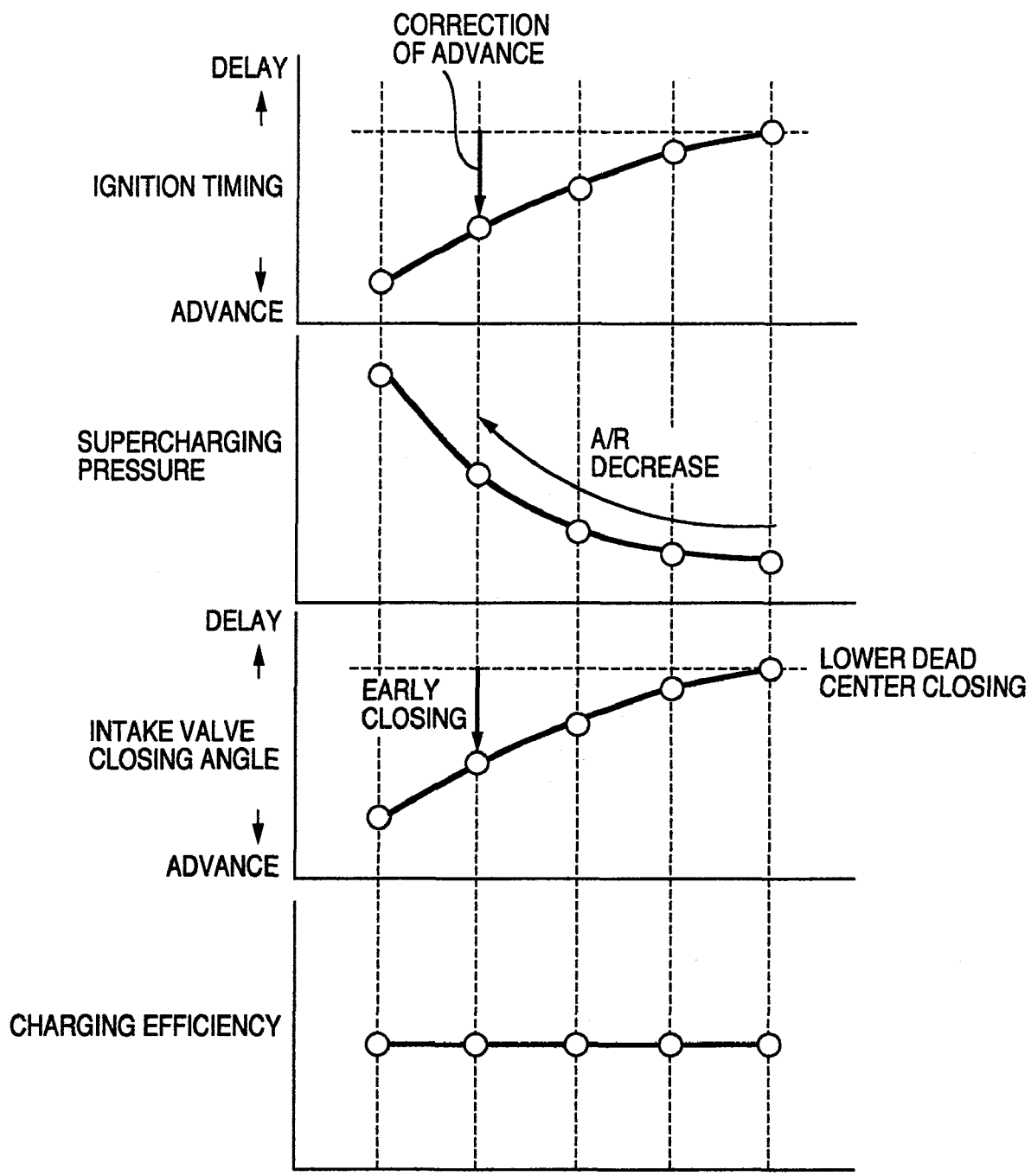
FIG. 14 is a view illustrating the relationship between a closing timing of an intake valve and correction of ignition timing.

FIG. 14 is a view illustrating the relationship between the closing timing of the intake valve and correction of ignition timing. In the system according to the embodiment, combinations of controlled amounts of the variable intake valve and the variable turbocharger, by which the same rotating speed and the same charging efficiency are realized, are set as shown in FIG. 10 so as to realize an optimum fuel consumption. However, separation from the optimum fuel consumption controlled amount occurs in a transient state such as conditions of acceleration, etc. FIG. 14 illustrates a method of correcting control of ignition timing in such case. In the same charging efficiency, when A/R decreases, supercharging pressure rises, so that it is needed to advance or delay the closing timing of the intake valve with reference to a lower dead center. In this manner, as the closing timing of the intake valve separates from the lower dead center, an actual compression amount of the piston decreases, so that an end-point temperature at an upper dead center of the piston drops. The larger the cooling effect produced by an intercooler, the more marked this tendency. Since a drop in end-point temperature at the upper dead center of the piston is effective in avoiding knocking, it is possible to advance the ignition timing. In this manner, the provision of ignition advance correcting means makes it possible to accurately control the ignition timing to an optimum point even at the transient time, thus enabling maintaining an output and a fuel consumption performance in an optimum condition at all times.

Figure 20:
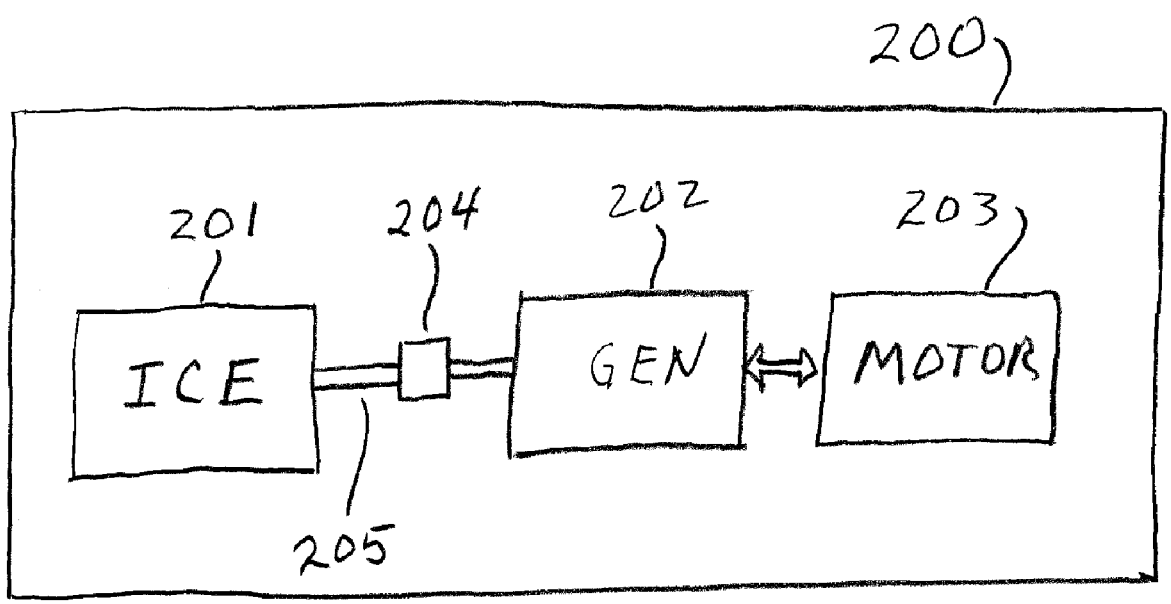
FIG. 20 is a block diagram of a hybrid system in which the control system according to the invention can be incorporated.

The system according to the embodiment is applicable to electrical generating systems, or hybrid systems 200, in which an internal combustion engine 201, a generator 202 and a motor 203 are used in combination, as shown, for example, in FIG. 20. In particular, the generator 202 may be connected by a connecting device 204 to the crank shaft 205 of the internal combustion engine 201, to cause the generator to generate electrical energy.

In internal combustion engines used in electrical generating systems and hybrid systems, relatively high load operating conditions for internal combustion engines are frequently used. Therefore, by controlling the present internal combustion engine, in which mirror cycle is performed by a turbocharger, in which flow rate-supercharging pressure characteristics are made variable, and a variable intake valve, so as to hold the same substantially in the range of around 0.5 to 1.5 in terms of charging efficiency, it is possible to improve the internal combustion engine in fuel consumption, thus enabling improving electrical generating systems, or hybrid systems in overall efficiency. Also, the system according to the embodiment is applicable to not only gasoline engines but also diesel engines.

Figure 15:
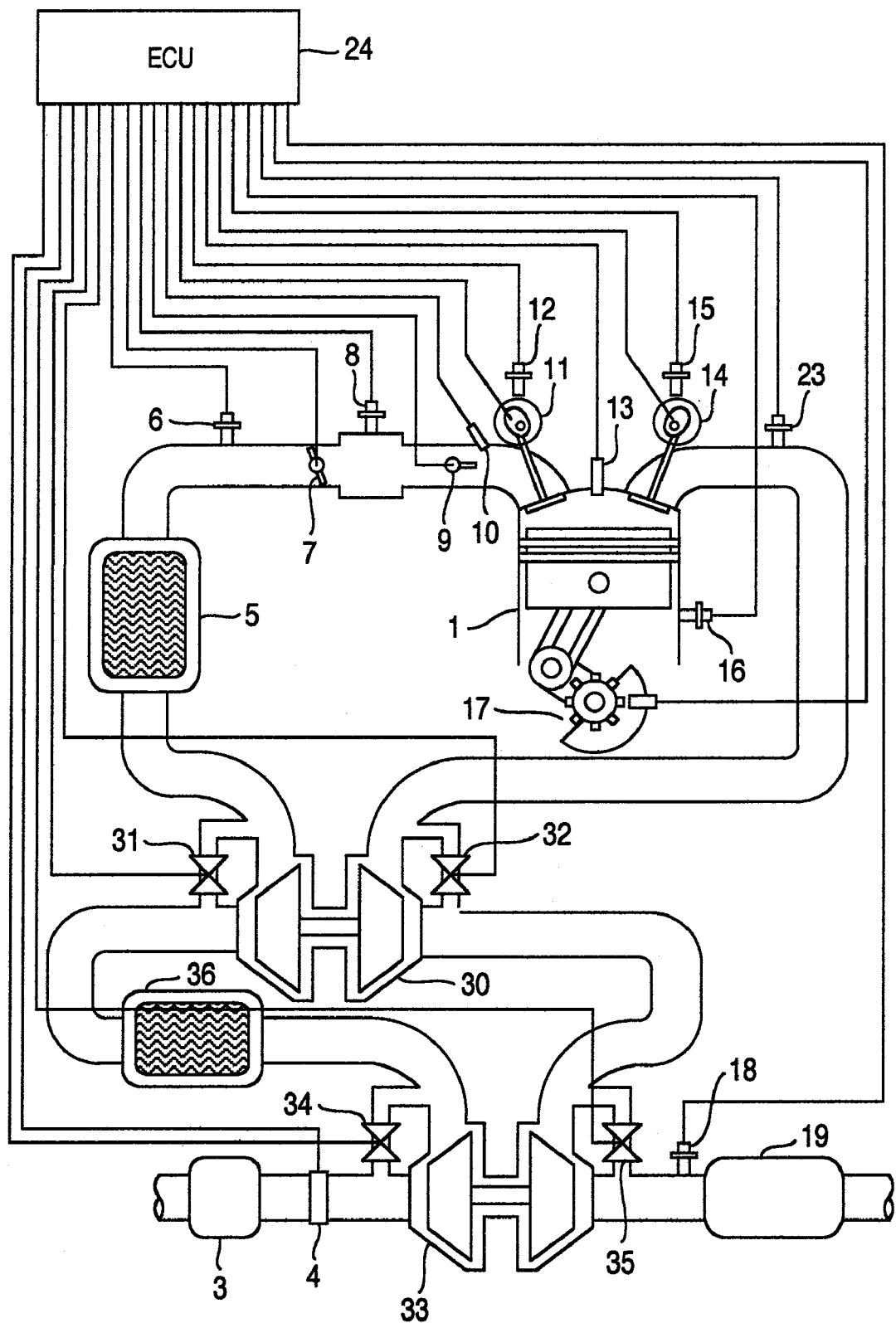
FIG. 15 is a view illustrating a second embodiment of the invention.

FIG. 15 is a view illustrating a second embodiment of the invention. A system according to the embodiment comprises, instead of the variable turbocharger in the system according to the first embodiment, a two-stage turbocharger composed of two turbochargers having different flow rate-supercharging pressure characteristics. The two-stage turbocharger comprises a turbocharger 30 of small flow rate type and a turbocharger 33 of large flow rate type. Air bypass valves 31, 34 and waste-gate valves 32, 35, respectively, provided on the turbocharger 30 of small flow rate type and the turbocharger 33 of large flow rate type are operatively opened and closed according to an operating state of an internal combustion engine to enable selecting an operating mode of the two-stage turbocharger. That is, by closing the air bypass valve and the waste-gate valve of that turbocharger, which are desired to operate, it is possible to lead an intake air and exhaust gases into the turbocharger to drive the exhaust turbine. In addition, the system according to the embodiment is constructed to use the two-stage turbocharger having two large and small flow rate-supercharging pressure characteristics as a multi-stage turbocharger but the invention is not limited thereto. That is, three or more turbochargers having different flow rate-supercharging pressure characteristics may be provided and switched over.

Figure 16:
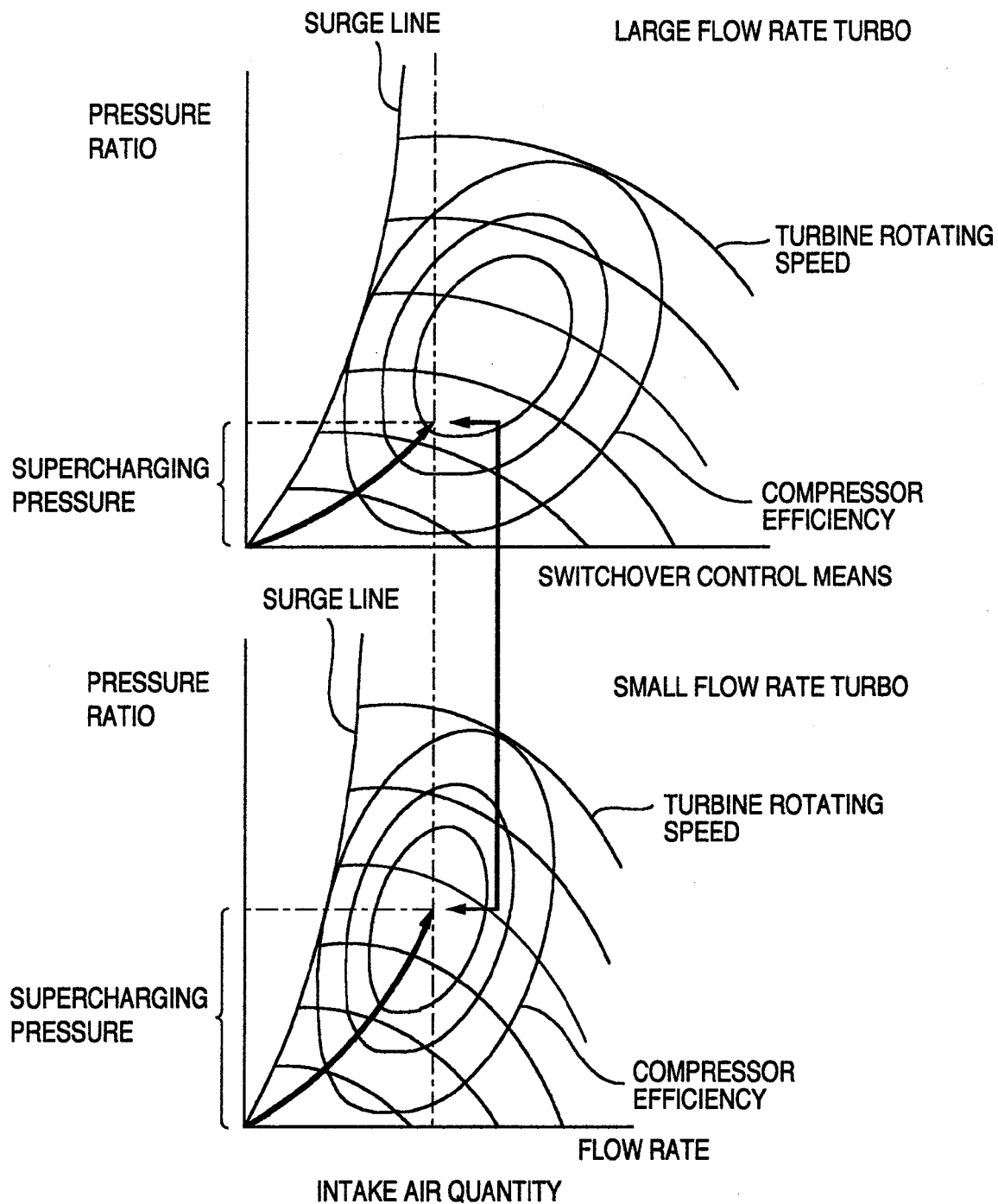
FIG. 16 is a view illustrating flow rate-supercharging pressure characteristics of large flow rate and small flow rate turbochargers, which constitute a two-stage turbocharger.

FIG. 16 is a view illustrating flow rate-supercharging pressure characteristics of the large flow rate turbocharger and the small flow rate turbocharger, which constitute a two-stage turbocharger. Even when the quantities of the intake air are the same, the large flow rate turbocharger and the small flow rate turbocharger are different from each other in end-point supercharging pressure and also in exhaust turbine inlet pressure. Accordingly, the large flow rate turbocharger and the small flow rate turbocharger are different from each other in pumping loss determined by the relationship between supercharging pressure Pc and exhaust pressure Pt. The method illustrated in the first embodiment can be substantially followed by a control method, in which mirror cycle is performed by the two-stage turbocharger and the variable intake valve. That is, it suffices to operatively open and close the air bypass valves and the waste-gate valves of the two-stage turbocharger so that a turbocharger, in which Pc becomes further large in that range, in which supercharging pressure Pc and exhaust pressure Pt are prescribed by Pt/Pc≦C, operates.

Figure 17A:
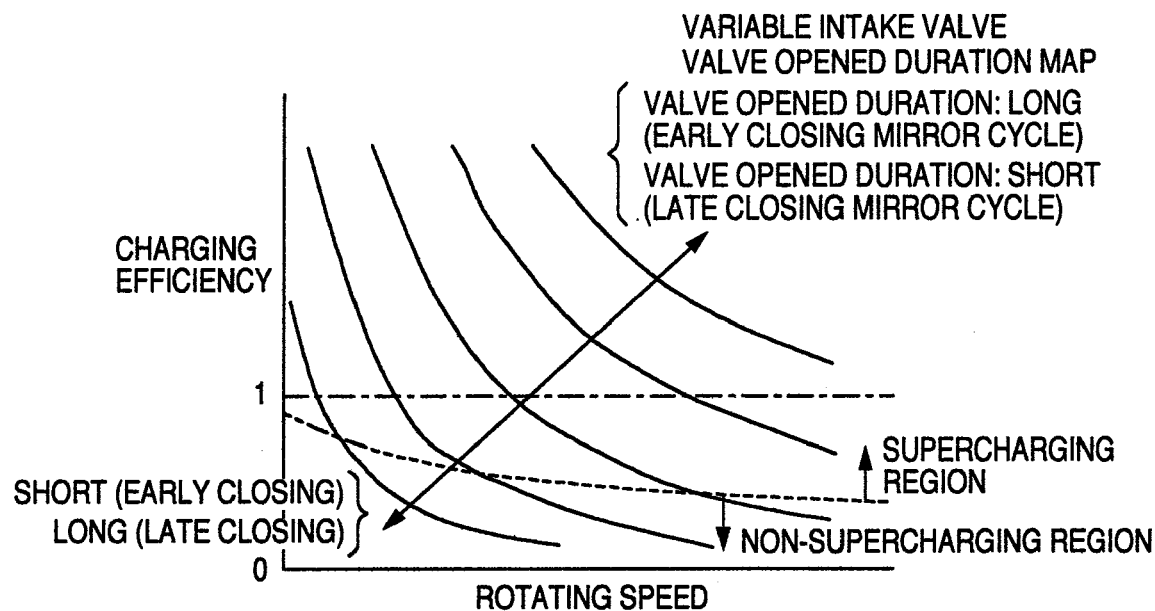
FIGS. 17A and 17B are views illustrating an opened duration of a variable intake valve and respective control maps of a two-stage turbocharger in an internal combustion engine, which comprises the variable intake valve and the two-stage turbocharger and in which mirror cycle is performed.
Figure 17B:
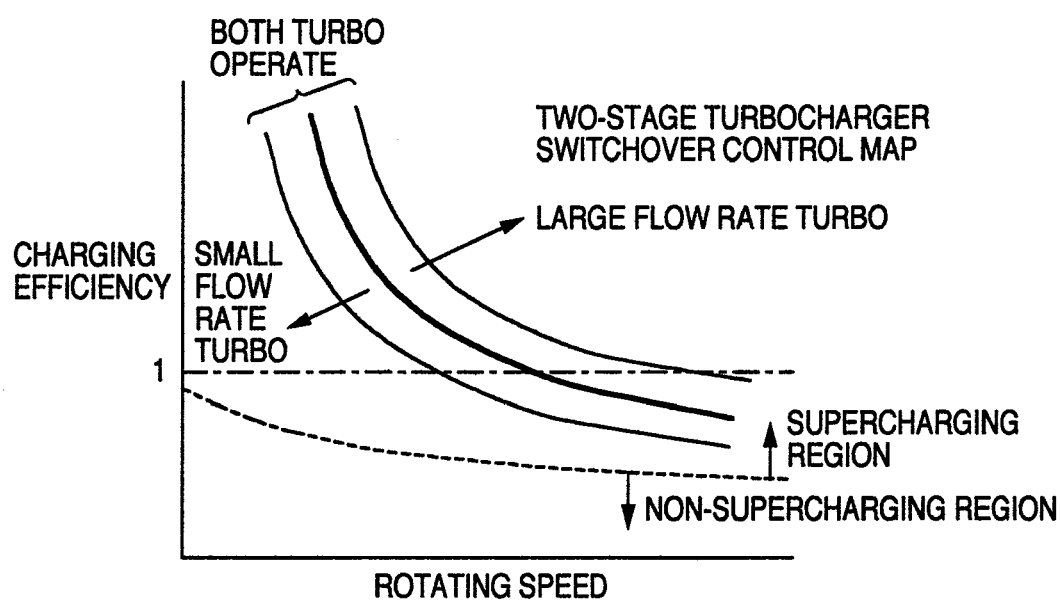

FIGS. 17A and 17B are views illustrating control maps of an opened duration of the variable intake valve and the two-stage turbocharger in the internal combustion engine, which comprises the variable intake valve and the two-stage turbocharger and in which mirror cycle is performed. The control maps comprise a two-dimensional map, in which a rotating speed and a charging efficiency are indicated by axes. The variable intake valve is shown for two cases, that is, an early closing mirror cycle and a late closing mirror cycle, and is substantially the same as the combination control with the variable turbocharger as illustrated in FIG. 10. Broken lines in the maps indicate a border of a supercharging region, in which a supercharger works and an intake pipe pressure becomes large as compared with the atmosphere, and supercharging and mirror cycle are performed simultaneously in a region, in which a charging efficiency is equal to or less than 1, in the system according to the embodiment. By setting a flow rate of the two-stage turbocharger to that level, in which supercharging can be performed in a region, in which a charging efficiency is equal to or less than 1, an improvement in fuel consumption can be achieved even in a relatively high load region. Irrespective of whether an early closing mirror cycle or a late closing mirror cycle is performed, an operating mode of the two-stage turbocharger is preferably set according to the quantity of an intake air per unit time as shown in FIG. 17B. In order to eliminate generation of torque step when turbochargers are switched over with a solid line as a border, there is provided a region, in which the both turbochargers operate. Both map data are beforehand adapted in the stage of development of the internal combustion engine so that a turbocharger, in which Pc becomes further large in that range, in which supercharging pressure Pc and exhaust pressure Pt are prescribed by $Pt/Pc \leq C$, operates, and recorded in a memory of ECU. In an operating state except that at the time of quick acceleration and deceleration, data on the maps based on a rotating speed and a charging efficiency as detected are referred to and an operating mode of the two-stage turbocharger and a variable valve are controlled to optimum values at all times.

Figure 18:
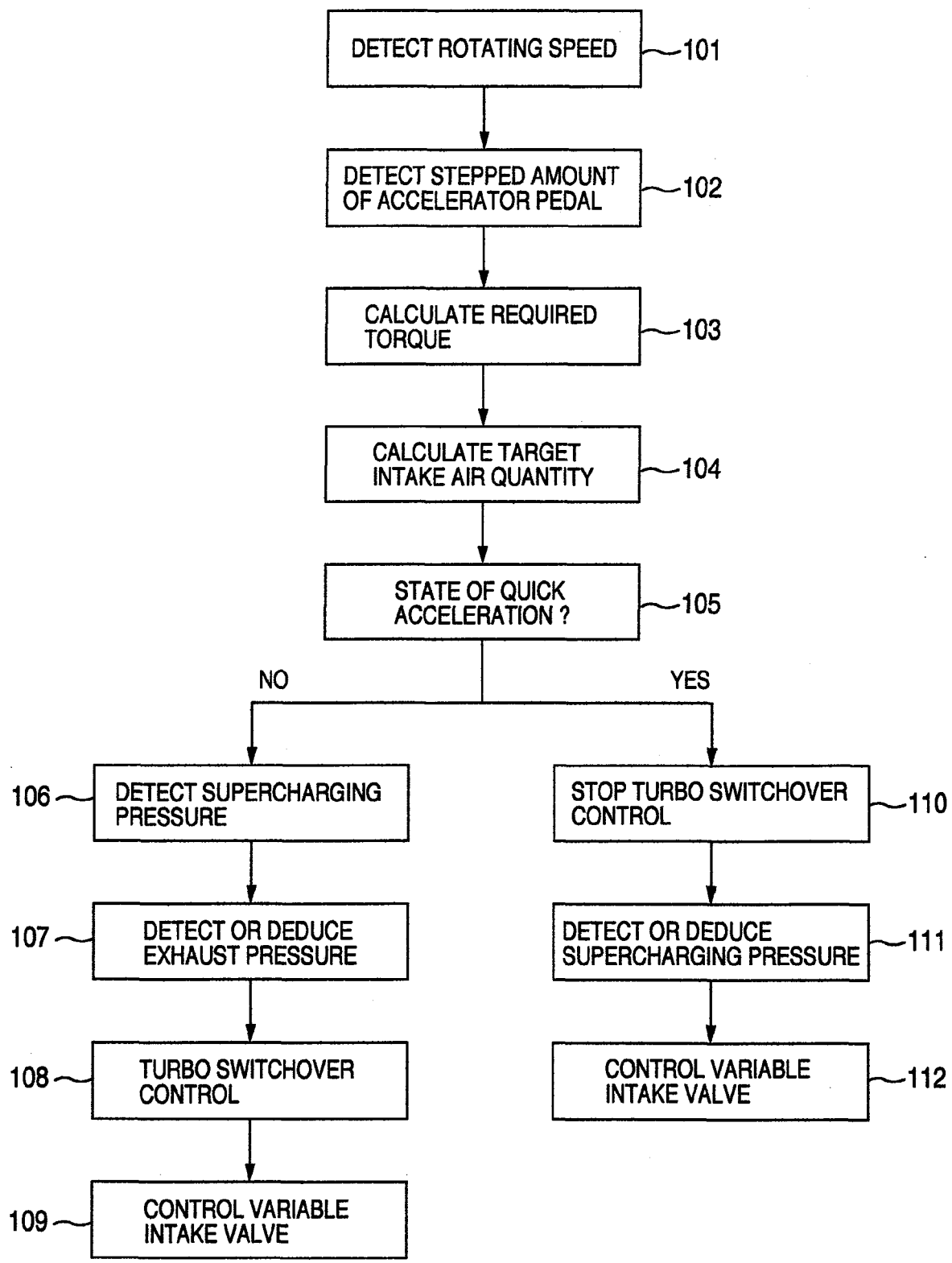
FIG. 18 is a view illustrating that control logic of a variable intake valve and a two-stage turbocharger, which is executed in a control software product of ECU.

FIG. 18 is a view illustrating that control logic of the variable intake valve and the two-stage turbocharger, which is executed in a control software product of ECU. Calculation made in STEP 101 to STEP 105 is the same as that for the control logic of the variable intake valve and the variable turbocharger, which is described above in FIG. 11, and so is omitted here. When being put in a state of steady or gentle acceleration other than the state of quick acceleration is determined in STEP 105, the procedure proceeds to STEP 106. In STEP 106, supercharging pressure is detected on the basis of an output signal of an intake pressure sensor provided on the intake pipe. With the system according to the embodiment, the pressure sensor is provided on the exhaust pipe upstream of the exhaust turbine to detect the exhaust pressure in STEP 107. Also, it is also possible to deduce the exhaust pressure on the basis of the quantity of the intake air and the opening degree of the waste-gate valve. A method of deducing an exhaust pressure is already described with reference to FIG. 13. In STEP 108, an operating mode of the two-stage turbocharger is selected from the relationship between the supercharging pressure Pc and the exhaust pressure Pt, which are detected or deduced in STEP 106 and STEP 107. At this time, out of two combinations of the variable intake valve opened duration and the turbocharger flow rate, a turbocharger, in which Pc becomes further large in that range, in which the relationship of $Pt/Pc \leq C$ is met. By closing an air bypass valve and a waste-gate valve, which are provided on the turbocharger as selected, gases are led into the turbocharger to drive the exhaust turbine. Selection of the turbocharger flow rate is recorded as map data illustrated in FIG. 17 in a memory of ECU. When a turbocharger is selected, supercharging pressure is determined. Based on the supercharging pressure, a rotating speed, and a target intake air quantity, an opened duration of the variable intake valve is controlled in STEP 109. On the other hand, in case of being determined as being put in a state of quick acceleration, the procedure proceeds to STEP 110. In STEP 110, turbocharger switchover control is first stopped. In STEP 111, supercharging pressure is detected by a pressure sensor provided on the intake pipe. At this time, means, which deduces a transient change in turbine rotating speed to deduce supercharging pressure, may be used. A method of deducing a turbine rotating speed and supercharging pressure is already described with reference to FIG. 13. In deducing a turbine rotating speed, supercharging pressure, and exhaust pressure of the two-stage turbocharger, it is necessary to provide means for deduction for two large and small turbochargers, respectively. By appropriately executing the turbocharger switchover control while deducing a turbine rotating speed, it is possible to decrease a torque step, thus enabling preventing deterioration in operability. In STEP 112, variable intake valve control is executed from the supercharging pressure, the turbine rotating speed, which are obtained, and a target intake air quantity.

Figure 19:
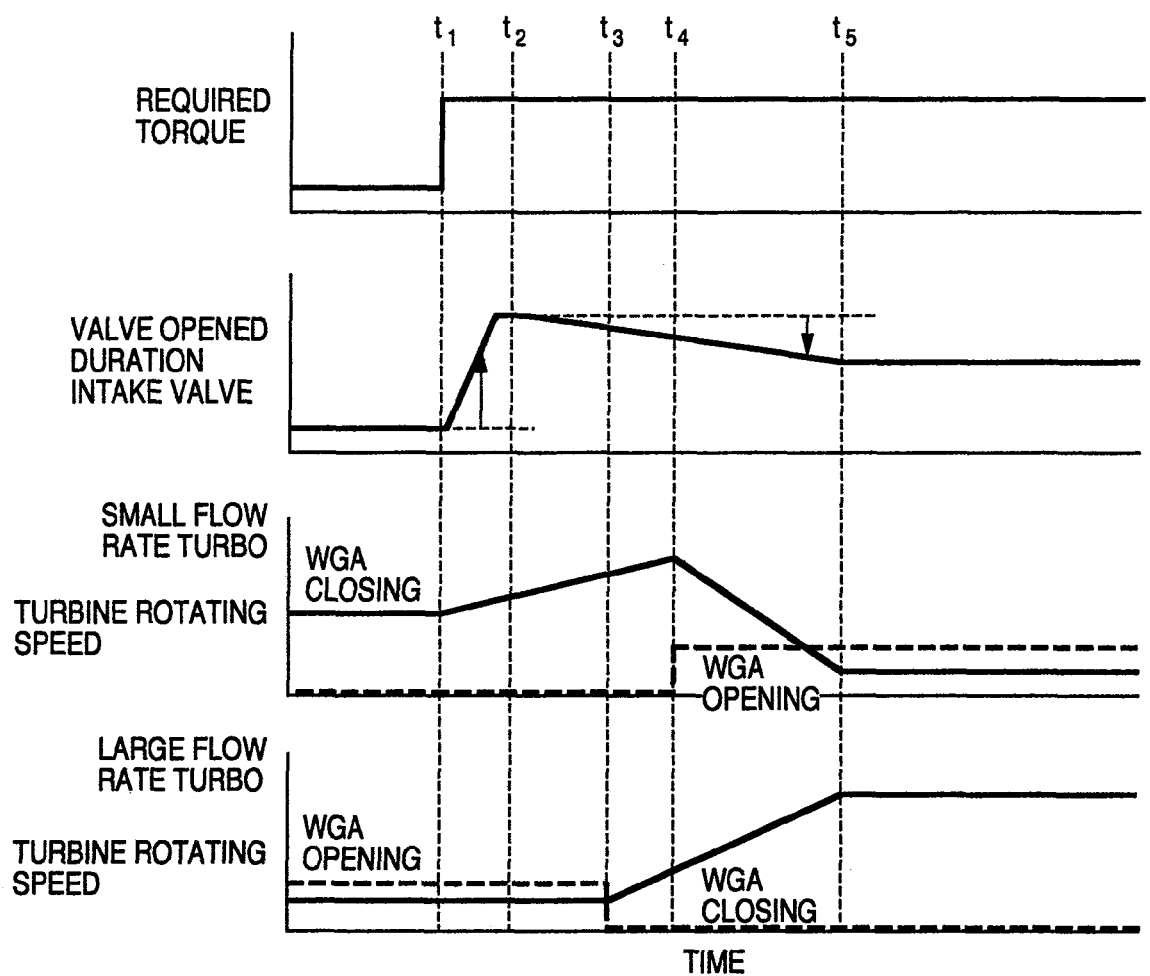
FIG. 19 is a time chart illustrating an intake valve opened duration and a method of controlling a two-stage turbocharger when quick acceleration is performed.

FIG. 19 is a time chart illustrating the intake valve opened duration and a method of controlling the two-stage turbocharger when quick acceleration is performed. At timing $t_1$, a driver steps on an accelerator pedal to perform quick acceleration. The intake valve opened duration is instantly increased meeting with a required torque, which increases stepwise. At this time, turbocharger switchover control of the two-stage turbocharger is stopped. At timing $t_2$, at which a target torque is reached, determination of whether turbocharger switchover should be made begins. At timing $t_3$, it is determined that a turbocharger, in which Pc becomes further large in that range, in which supercharging pressure Pc and exhaust pressure Pt are prescribed by $Pt/Pc \leq C$, is a large flow rate side turbocharger. By closing an air bypass valve and a waste-gate valve, which are provided on the large flow rate side turbocharger, gases are led into the turbocharger to drive the exhaust turbine. At this time, the air bypass valve and the waste-gate valve, which are provided on a small flow rate side turbocharger, are not instantly opened and a duration, during which the both turbochargers operate, is provided. This is because it is directed to decreasing a torque step when switchover to the large flow rate side turbocharger from the small flow rate side turbocharger is made. At timing $t_4$, at which the turbine rotating speed of the large flow rate side turbocharger rises sufficiently to perform supercharging, an operating mode of the small flow rate side turbocharger is switched to a stopped state. Since supercharging pressure is increased in the duration of $t_2$ to $t_6$, control is executed so that the intake valve opened duration is gradually decreased in order to hold a charging efficiency in a constant state. At timing $t_6$, at which the relationship illustrated in FIG. 9 is established between supercharging pressure and exhaust pressure, operations of the variable intake valve and the variable turbocharger are stopped.

According to the present invention, there is provided a control device for an internal combustion engine, which comprises a turbocharger, of which turbo flow rate is made variable, and an intake valve provided with a variable valve mechanism and in which mirror cycle is performed, comprises: means, which calculates an intake air quantity per unit time and an intake air quantity per cycle on the basis of torque required to the internal combustion engine; means, which controls the turbocharger so that with the intake air quantity per unit time, supercharging pressure is further increased in a range in which a ratio of supercharging pressure and exhaust pressure is equal to or less than a predetermined value; and means, which controls the variable valve mechanism on the basis of the supercharging pressure and the intake air quantity per cycle, and the variable turbocharger is a variable turbocharger, in which a flap vane provided on an exhaust turbine inlet portion is operatively opened and closed to change a ratio of (A/R) of an area A of an exhaust turbine inlet nozzle and a distance R from an exhaust turbine inlet position to an axial center of an exhaust turbine, and which comprises means, which controls A/R of the exhaust turbine so that with the intake air quantity per unit time, supercharging pressure is increased in the range in which a ratio of supercharging pressure and exhaust pressure is equal to or less than a predetermined value.

With this structure, by setting A/R small, it is possible to raise exhaust pressure and supercharging pressure even in small flow rate. Also, by setting A/R large at the time of large flow rate, it is possible to suppress exhaust pressure, which rises excessively. In this manner, by setting A/R variously, it is possible to control a turbocharger so that supercharging pressure is increased in the range in which a ratio of supercharging pressure and exhaust pressure is equal to or less than a predetermined value, under further wide operating conditions.

Also, the turbocharger, of which flow rate is variable, may be a multi-stage turbocharger, which comprises a plurality of turbochargers having different flow rate-supercharging pressure characteristics and in which waste-gate valves provided on the plurality of turbochargers are operatively opened and closed to select operating modes of the plurality of turbochargers, and comprises means, which controls the waste-gate valves of the multi-stage turbocharger so that with the intake air quantity per unit time, supercharging pressure is increased in that range, in which a ratio of supercharging pressure and exhaust pressure is equal to or less than a predetermined value.

With this structure, by using a turbocharger or turbochargers on a small flow rate side, it is possible to raise exhaust pressure and supercharging pressure also even in small flow rate. Also, as the flow rate increases, sequential switchover to a turbocharger or turbochargers on a large flow rate side also makes it possible to suppress exhaust pressure, which rises excessively. In this manner, by switching and using a turbocharger or turbochargers having different flow rate-supercharging pressure characteristics, it is possible to control the turbocharger or turbochargers so that supercharging pressure is increased in that range, in which a ratio of supercharging pressure and exhaust pressure is equal to or less than a predetermined value, under further wide operating conditions.

Also, the intake valve is a variable intake valve provided with a variable mechanism, which changes at least one of an opening and closing timing and a lift of the valve continuously or stepwise, and comprises means, which sets a closing timing of the variable intake valve to an advance side or a delay side with reference to a lower dead center in a state in which the intake valve opening timing is substantially fixed to an upper dead center of the internal combustion engine, thereby decreasing the piston compression amount as compared with the piston compression expansion amount.

With this structure, it is possible to realize a highly efficient mirror cycle without the provision of a new mechanism on a crank mechanism.

Also, there are provided means, which calculates torque required to the internal combustion engine on the basis of an amount, by which a driver steps on an accelerator pedal, means, which calculates a target intake air quantity per cycle of the internal combustion engine on the basis of the required torque, and means, which controls an opening timing and an opened duration of the variable intake valve on the basis of the target intake air quantity per cycle, the supercharging pressure, and a rotating speed of the internal combustion engine.

With this structure, it is possible to accurately realize torque as required.

Also, there is provided means, which detects the exhaust pressure with an exhaust pressure sensor provided upstream of an exhaust turbine.

According to this, exhaust pressure is detected by the exhaust pressure sensor provided upstream of the exhaust turbine, it is possible to accurately control the turbocharger to a working point, in which an adverse factor for fuel consumption due to pumping loss and an improvement factor for fuel consumption owing to mirror cycle are compatible and supercharging pressure becomes maximum in that range, in which a ratio of supercharging pressure and exhaust pressure is equal to or less than a predetermined value.

Also, there is provided means, which deduces or calculates the exhaust pressure on the basis of the intake air quantity, the supercharging pressure, and A/R of the exhaust turbine.

According to this, exhaust pressure can be deduced on the basis of an intake air quantity, supercharging pressure, and A/R of an exhaust turbine. Also, data of exhaust pressure may be recorded as a map, in which operating parameters such a load, a rotating speed of an internal combustion engine, etc. are indicated by axes, in a memory of ECU to be calculated. Since the level of exhaust pressure are considerably influenced by not only operating parameters of an internal combustion engine but also A/R of an exhaust turbine, it is necessary in calculation of exhaust pressure to take account of influences due to A/R. With such construction, it is possible to know the level of exhaust pressure without providing an exhaust pressure sensor newly and to accurately control a turbocharger to a working point, in which supercharging pressure becomes maximum in that range, in which the ratio of supercharging pressure and exhaust pressure is equal to or less than a predetermined value.

Also, there is provided means, which deduces or calculates the exhaust pressure on the basis of the intake air quantity, the supercharging pressure, and a state, in which the waste-gate valves of the multi-stage turbocharger are opened or closed.

According to this, it is possible to deduce an exhaust pressure on the basis of an intake air quantity and a state, in which the waste-gate valves of the multi-stage turbocharger are opened or closed. Also, data of exhaust pressure may be recorded as a map, in which operating parameters such a load, a rotating speed of an internal combustion engine, etc. are indicated by axes, in a memory of ECU to be calculated. Since the level of exhaust pressure are considerably influenced by not only operating parameters of an internal combustion engine but also flow rate-supercharging pressure characteristics of a turbocharger or turbochargers, which operate, out of turbochargers, which constitute a multi-stage turbocharger, it is necessary in calculation of exhaust pressure to take account of influences by an operating mode of the multi-stage turbocharger. With such construction, it is possible to know the level of exhaust pressure without providing an exhaust pressure sensor newly and to accurately control a turbocharger to a working point, in which supercharging pressure becomes maximum in that range, in which the ratio of supercharging pressure and exhaust pressure is equal to or less than a predetermined value.

Also, there are provided either of means, which deduces a turbine rotating speed of the turbocharger on the basis of the intake air quantity and the supercharging pressure and means, which detects a turbine rotating speed; means, which calculates an operation working point of the turbocharger on the basis of the intake air quantity, the supercharging pressure, and the turbine rotating speed; and means, which controls the turbocharger, of which flow rate is variable, on the basis of the operation working point of the turbocharger.

According to this, since there are provided means, which deduces a rotating speed of the turbocharger on the basis of at least the intake air quantity and the supercharging pressure, or means, which detects the turbine rotating speed, it is possible to deduce an operation working point of the turbocharger on the basis of the intake air quantity, the supercharging pressure, and the turbine rotating speed. By controlling a turbocharger, of which flow rate is variable, on the basis of the operation working point, it is possible even in an operating state, in which a turbine rotating speed changes transiently, to accurately control a turbocharger to a working point, in which supercharging pressure becomes maximum in that range, in which the ratio of supercharging pressure and exhaust pressure is equal to or less than a predetermined value.

Also, there is provided means, which increases an opened duration of the variable intake valve on the basis of the required torque at the time of acceleration of the internal combustion engine, at which an amount of an accelerator pedal stepping-on operation by a driver is equal to or more than a predetermined value, and thereafter increases A/R of the exhaust turbine on the variable turbocharger.

According to this, when it is determined that variation of an accelerator pedal stepping-on operation by a driver is equal to or more than a predetermined value and an internal combustion engine is put in a state of acceleration, simultaneous control of a variable turbocharger and a variable intake valve is stopped, control is first exercised to increase an opened duration of the intake valve, and thereafter control of the turbocharger is exercised. The variable intake valve, which is excellent in responsibility, is used to ensure an intake air quantity, which realizes torque required by a driver, and thereafter A/R of a variable turbocharger, which is relatively slow in responsibility, is controlled. Thereby, a required torque can be accurately traced to prevent deterioration in operability and A/R of a variable turbocharger is made appropriate to enable preventing deterioration in fuel consumption under operating conditions after acceleration.

Also, there are provided means, which increases an opened duration of the variable intake valve on the basis of the required torque at the time of acceleration of the internal combustion engine, at which variation of an accelerator pedal stepping-on operation by a driver is equal to or more than a predetermined value, and thereafter controls the waste-gate valves of the multi-stage turbocharger from a mode, in which the turbocharger or turbochargers on the small flow rate side in the flow rate-supercharging pressure characteristics operate, to a mode, in which the turbocharger or turbochargers on the large flow rate side operate.

According to this, when it is determined that variation of an accelerator pedal stepping-on operation by a driver is equal to or more than a predetermined value and an internal combustion engine is put in a state of acceleration, simultaneous control of a multi-stage turbocharger and a variable intake valve is stopped, control is first exercised to increase an opened duration of the variable valve, and thereafter control of the turbocharger is exercised. The variable intake valve, which is excellent in responsibility, is used to ensure an intake air quantity, which realizes torque required by a driver, and thereafter waste-gate valves are operatively opened and closed to switch an operation of a multi-stage turbocharger, which is relatively slow in responsibility. Thereby, a required torque can be accurately traced to prevent deterioration in operability and flow rate-supercharging pressure characteristics of the multi-stage turbocharger are appropriately switched to enable preventing deterioration in fuel consumption under operating conditions after acceleration.

Also, there are provided means, which controls an ignition timing of the internal combustion engine to an advance side as a closing timing of the intake valve separates from a lower dead center, under the intake air quantity per unit time.

Thereby, with an internal combustion engine, which comprises a variable intake valve and a turbocharger, of which turbo flow rate is made variable, it is possible to optionally select a combination of an operation working point, which represents the same intake air quantity, supercharging pressure, and the intake valve closing timing. Since the intake valve closing timing is set to an advance side and a delay side from a lower dead center to cause an actual compression amount to decrease, end-point temperature and pressure when a piston is at a compression upper dead center are decreased. Therefore, frequency, in which knocking occurs, decreases, thus enabling setting a required ignition timing to an advance side. By appropriately advance controlling an ignition timing according to an extent of separation of the intake valve closing timing from a lower dead center, it is possible to hold fuel consumption and output performance at best points.

Also, there are provided means, which connects a generator to a crank shaft of the internal combustion engine to cause the connected generator to generate electrical energy, and means, which controls the internal combustion engine so that the charging efficiency of the internal combustion engine is held substantially in a high load condition of around 0.5 to 1.5.

According to this, when a generator is connected to a crank shaft of an internal combustion engine and the connected generator generates electrical energy, control is exercised so that the charging efficiency of the internal combustion engine is held substantially in a high load condition of around 0.5 to 1.5. Thereby, a combination of turbo supercharging and mirror cycle can adequately produce an effect of fuel saving benefit, thus enabling improving electrical generating systems in overall efficiency.

Also, there is provided means including a hybrid system composed of the internal combustion engine, a motor, and a generator, and controlling the internal combustion engine so that the charging efficiency of the internal combustion engine is held substantially in a high load condition of around 0.5 to 1.5.

According to this, there is provided a hybrid system composed of an internal combustion engine, a motor, and a generator, and control is exercised so that the charging efficiency of the internal combustion engine is held substantially in a high load condition of around 0.5 to 1.5. Thereby, even in a hybrid system, in which relatively high load operating conditions are frequently used, a combination of turbo supercharging and mirror cycle can produce a sufficient fuel saving benefit, thus enabling improving a hybrid system in overall efficiency.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of controlling an internal combustion engine which is operated according to a mirror cycle and comprises a turbocharger with a variable turbo flow rate, an intake valve with a variable valve mechanism, sensors for sensing engine and turbochargers operating parameters, and a control unit for receiving output signals of said sensors and generating control signals for controlling operation of said engine and turbocharger, the method comprising:

controlling the variable valve mechanism, based on signals from said sensors, to increase an opened duration of the intake valve as torque required to the internal combustion engine increases stepwise; and controlling the turbocharger, based on signals from said sensors, to increase turbo flow rate and at the same time, controlling the variable valve mechanism to decrease an opened duration of the intake valve when torque of the internal combustion engine reaches the required torque.

2. The method according to claim 1, wherein:

torque of the internal combustion engine is controlled to conform to the required torque; and said turbocharger, is controlled so that a ratio of exhaust pressure to supercharging pressure is equal to or less than a predetermined value and supercharging pressure is further increased.

3. The method according to claim 2, wherein the supercharging pressure is controlled to correspond to a maximum value.

4. A control device for an internal combustion engine having a turbocharger with a variable turbo flow rate, said control device comprising:
- sensors for sensing engine and turbocharger operating parameters;
- a control unit that receives signals from said sensors, and calculates an intake air quantity per unit time and an intake air quantity per cycle on the basis of torque required to the internal combustion engine;
- means which controls a turbocharger so that with the intake air quantity per unit time, supercharging pressure is further increased in that range, in which a ratio of supercharging pressure and exhaust pressure is equal to or less than a predetermined value; and
- means which controls a variable valve mechanism on the basis of the supercharging pressure and the intake air quantity per cycle.

5. A control device for an internal combustion engine, having a turbocharger with a variable turbo flow rate and a variable intake valve, and in which mirror cycle is performed, the control device comprising:
- sensors for sensing engine and turbocharger operating parameters; and
- a control unit for receiving output signals of said sensors and generating control signals for controlling operation of said engine and turbocharger, wherein said control unit includes,
- means which calculates an intake air quantity per unit time and an intake air quantity per cycle on the basis of torque required to the internal combustion engine;
- means which controls the turbocharger so that for the calculated intake air quantity per unit time, supercharging pressure is further increased when the engine is operated such that a ratio of exhaust pressure to supercharging pressure is equal to or less than a predetermined value; and
- means which controls the variable valve mechanism on the basis of the supercharging pressure and the calculated intake air quantity per cycle.

6. The control device for an internal combustion engine, according to claim 5, wherein the turbocharger, of which flow rate is variable, is a variable turbocharger, in which a flap vane provided on an exhaust turbine inlet portion is operatively opened and closed to change A/R which means a ratio of an area A of an exhaust turbine inlet nozzle and a distance R from an exhaust turbine inlet position to an axial center of an exhaust turbine, and the turbocharger comprises means, which controls A/R of the exhaust turbine so that with the intake air quantity per unit time, supercharging pressure is increased in that range, in which a ratio of supercharging pressure and exhaust pressure is equal to or less than a predetermined value.

7. The control device for an internal combustion engine, according to claim 6, further comprises means, which deduces or calculates the exhaust pressure on the basis of the i) intake air quantity, ii) the supercharging pressure, and iii) A/R of the exhaust turbine.

8. The control device for an internal combustion engine, according to claim 5, wherein the turbocharger, of which flow rate is variable, comprises a multi-stage turbocharger, which comprises a plurality of turbochargers having different flow rate-supercharging pressure characteristics and in which waste-gate valves provided on the plurality of turbochargers are operatively opened and closed to select operating modes of the plurality of turbochargers, and the multi-stage turbocharger comprises means, which controls the waste-gate valves of the multi-stage turbocharger so that with the intake air quantity per unit time, supercharging pressure is increased in that range, in which a ratio of supercharging pressure and exhaust pressure is equal to or less than a predetermined value.

9. The control device for an internal combustion engine, according to claim 8, further comprising means, which deduces or calculates the exhaust pressure on the basis of the intake air quantity, the supercharging pressure, and a state, in which the waste-gate valves of the multi-stage turbocharger are opened or closed.

10. The control device for an internal combustion engine, according to claim 5, wherein the intake valve comprises a variable intake valve provided with a variable mechanism, which changes at least one of an opening and closing timing and lift of the valve continuously or stepwise, and the variable intake valve comprises means, which sets a closing timing of the variable intake valve to an advance side or a delay side with reference to a lower dead center in a state, in which an intake valve opening timing is substantially fixed to an upper dead center of the internal combustion engine, thereby decreasing the piston compression amount as compared with the piston compression expansion amount.

11. The control device for an internal combustion engine, according to claim 10, further comprising means, which controls an ignition timing of the internal combustion engine to an advance side as a closing timing of the intake valve separates from a lower dead center, with the intake air quantity per unit time.

12. The control device for an internal combustion engine, according to claim 5, further comprising:
- means, which calculates torque required to the internal combustion engine on the basis of an amount, by which a driver steps on an accelerator pedal;
- means, which calculates a target intake air quantity per cycle of the internal combustion engine on the basis of the required torque; and
- means, which controls an opening timing and an opened duration of the variable intake valve on the basis of the target intake air quantity per cycle, the supercharging pressure, and a rotating speed of the internal combustion engine.

13. The control device for an internal combustion engine, according to claim 12, further comprising means, which increases an opened duration of the variable intake valve on the basis of the required torque at the time of acceleration of the internal combustion engine, at which variation of an accelerator pedal stepping-on operation by a driver is equal to or more than a predetermined value, and thereafter increases A/R of the exhaust turbine on the variable turbocharger.

14. The control device for an internal combustion engine, according to claim 12, further comprising means, which increases an opened duration of the variable intake valve on the basis of the required torque at the time of acceleration of the internal combustion engine, at which variation of an accelerator pedal stepping-on operation by a driver is equal to or more than a predetermined value, and thereafter controls the waste-gate valves of the multi-stage turbocharger from a mode, in which the turbocharger or turbochargers on the small flow rate side in the flow rate-supercharging pressure characteristics operate, to a mode, in which the turbocharger or turbochargers on the large flow rate side operate.

15. The control device for an internal combustion engine, according to claim 5, further comprising means, which detects the exhaust pressure with an exhaust pressure sensor provided upstream of an exhaust turbine.

16. The control device for an internal combustion engine, according to claim 5, further comprising:
   means which determines a turbine rotating speed of the turbocharger;
   means which calculates an operation working point of the turbocharger on the basis of the intake air quantity, the supercharging pressure, and the turbine rotating speed; and
   means which controls the turbocharger, of which flow rate is variable, on the basis of the operation working point of the turbocharger.

17. The method according to claim 16, wherein said means which determines turbine rotating speed deduces said turbine rotating speed based on intake air quantity and supercharging pressure.

18. The control device for an internal combustion engine, according to claim 5, further comprising: means, which connects a generator to a crank shaft of the internal combustion engine to cause the connected generator to generate electrical energy; and means, which controls the internal combustion engine so that the charging efficiency of the internal combustion engine is held substantially in a high load condition of 0.5 to 1.5.

19. The control device for an internal combustion engine, according to claim 5, further comprising:
   a hybrid system composed of the internal combustion engine, a motor, and a generator; and
   means for controlling the internal combustion engine so that the charging efficiency of the internal combustion engine is held substantially in a high load condition of 0.5 to 1.5.

* * * * *